(12) United States Patent
Kang et al.

(10) Patent No.: US 10,955,640 B2
(45) Date of Patent: Mar. 23, 2021

(54) CAMERA FOR ELECTRONIC DEVICE

(71) Applicant: LG ELECTRONICS INC., Seoul (KR)

(72) Inventors: Hyungjoo Kang, Seoul (KR); Dongryeol Lee, Seoul (KR); Jongwoo Jeong, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 90 days.

(21) Appl. No.: 16/401,015

(22) Filed: May 1, 2019

(65) Prior Publication Data
US 2019/0346653 A1    Nov. 14, 2019

Related U.S. Application Data

(60) Provisional application No. 62/733,068, filed on Sep. 18, 2018.

(30) Foreign Application Priority Data

May 11, 2018  (KR) .......................... 10-2018-0054536
Mar. 15, 2019 (KR) .......................... 10-2019-0029965

(51) Int. Cl.
  *G02B 7/02*   (2006.01)
  *G03B 17/12*  (2006.01)
  (Continued)

(52) U.S. Cl.
  CPC ............. *G02B 7/023* (2013.01); *G02B 7/026* (2013.01); *G02B 7/16* (2013.01); *G02B 13/001* (2013.01);
  (Continued)

(58) Field of Classification Search
  CPC . G02B 7/023; G02B 7/08; G02B 7/04; G02B 7/102; G02B 7/026; G02B 27/646;
  (Continued)

(56) References Cited

U.S. PATENT DOCUMENTS

2016/0344919 A1* 11/2016 Cho .................... H04N 5/2254
2017/0045753 A1   2/2017 Enta
  (Continued)

FOREIGN PATENT DOCUMENTS

KR    1020150098323    8/2015
KR    1020160137330    11/2016
KR    1020170143197    12/2017

OTHER PUBLICATIONS

PCT International Application No. PCT/KR2019/005188, Notification of Transmittal of the International Search Report and the Written Opinion of the International Searching Authority, or Declaration dated Aug. 13, 2019, 10 pages.

*Primary Examiner* — William R Alexander
*Assistant Examiner* — Sharrief I Broome
(74) *Attorney, Agent, or Firm* — Lee, Hong, Degerman, Kang & Waimey

(57) ABSTRACT

A camera for an electronic device, which is compact and exerts high performance is disclosed. The camera for an electronic device includes a housing, a lens assembly mounted movably inside the housing, an actuator configured to move the lens assembly relative to the housing, and a guide provided in the lens assembly and the housing, and configured to guide the relative movement of the lens assembly. The guide includes a first guide configured to support a first surface of the lens assembly with respect to the housing, for the relative movement of the lens assembly, and a second guide configured to support a second surface of the lens assembly, different from the first surface, with (Continued)

respect to the housing, for the relative movement of the lens assembly.

19 Claims, 14 Drawing Sheets

(51) Int. Cl.
  *G03B 17/17* (2006.01)
  *G02B 13/00* (2006.01)
  *G02B 7/16* (2006.01)
  *H04M 1/02* (2006.01)
(52) U.S. Cl.
  CPC .............. *G03B 17/12* (2013.01); *G03B 17/17* (2013.01); *H04M 1/0264* (2013.01)
(58) Field of Classification Search
  CPC ........ G02B 7/02; G02B 7/021; G02B 13/001; G02B 7/003; G02B 7/004; G02B 7/005; G02B 26/0875; G02B 7/022; G02B 7/09; G02B 27/0068; G02B 13/14; G02B 15/14; G02B 23/2423; G02B 26/0858; G03B 3/10; G03B 5/00; G03B 2205/0046; G03B 17/00; G03B 17/14; G03B 21/142; G03B 13/34; G03B 13/36; G03B 17/02; G03B 2205/0007; G03B 2205/0015; G03B 2205/0053; G03B 2205/0069; G03B 13/00; G03B 17/563; G03B 17/565; G03B 2205/0061; G03B 2205/0084; G03B 27/32; G03B 27/42; H04N 5/2254; H04N 5/2257; H04N 5/2252; H04N 5/23293; H04N 5/23296; H04N 13/0207; H04N 13/211; H04N 13/239; H04N 13/246; H04N 5/2251; H04N 5/225251; H04N 5/2253; H04N 5/2256; H04N 5/23209; H04N 5/23212; H04N 5/23216; H04N 5/23258; H04N 5/23287; H04N 5/232935; H04N 5/23299
  See application file for complete search history.

(56) References Cited

U.S. PATENT DOCUMENTS

2017/0285363 A1* 10/2017 Hu ........................... G02B 7/09
2017/0299945 A1   10/2017 Suzuki et al.
2017/0336699 A1* 11/2017 Hu ........................... G02B 7/09
2017/0353662 A1* 12/2017 Enta ................... H04N 5/23261

* cited by examiner

CAMERA FOR ELECTRONIC DEVICE

CROSS-REFERENCE TO RELATED APPLICATION(S)

Pursuant to 35 U.S.C. § 119, this application claims the benefit of earlier filing date and right of priority to Korean Patent Application No. 10-2018-0054536, filed on May 11, 2018, and Korean Patent Application No. 10-2019-0029965, filed on Mar. 15, 2019, and also claims the benefit of U.S. Provisional Application No. 62/733,068, filed on Sep. 18, 2018, the contents of which are all hereby incorporated by reference herein in their entirety.

BACKGROUND OF THE DISCLOSURE

1. Field of the Disclosure

The present disclosure relates to an electronic device using an image, and more particularly, to a camera for an electronic device, which is installed in the electronic device and acquires an image to be used.

2. Background of the Disclosure

In order to satisfy users' needs, electronic devices have been developed to execute a variety of functions. These electronic devices include home appliances, communication devices, and industrial devices. In many cases, functions required for an electronic device need information on an ambient environment, and in general, the information may accurately be acquired from images of the ambient environment. Although the electronic device may receive images from the outside, delay may be involved in acquiring required environmental information. Accordingly, to acquire a real-time, accurate image, electronic devices have been developed to include a camera configured to acquire an image.

In the recent years, electronic devices have become smaller to enhance portability. For example, portability is the most significant factor affecting the performance of a mobile terminal which is a communication device. Along with the miniaturization, high performance is also required for the electronic devices in order to satisfy users' needs. Both a small size and higher performance are also required equally for cameras installed in the electronic devices. A camera for an electronic device is under development according to these requirements.

A camera may be provided with movable parts to acquire an accurate image. For example, these movable parts may include a lens that moves to control a focal length in the camera. However, the movable parts may be relatively large in size, for stable guidance of their movements. Therefore, there is a need for configuring a camera for an electronic device such that movement of a movable part in the camera is stably guided, in order to achieve desired performance, while the camera is kept small in size.

SUMMARY OF THE DISCLOSURE

An aspect of the present disclosure is to address at least the above-mentioned problems and/or disadvantages and to provide at least the advantages described below. Accordingly, an aspect of the present disclosure is to provide a camera for an electronic device, which is configured to achieve high performance, although small in size.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a camera for an electronic device includes a housing, a lens assembly mounted movably inside the housing, an actuator configured to move the lens assembly relative to the housing, and a guide provided in the lens assembly and the housing, and configured to guide the relative movement of the lens assembly. The guide includes a first guide configured to support a first surface of the lens assembly with respect to the housing, for the relative movement of the lens assembly, and a second guide configured to support a second surface of the lens assembly, different from the first surface, with respect to the housing, for the relative movement of the lens assembly.

The actuator may be provided on the first surface of the lens assembly and a part of the housing, opposite to the first surface, and the first guide may be disposed in the vicinity of the actuator. Further, the second surface of the lens assembly may not be close to the first surface, and may not be coupled directly to the first surface. The second guide may be disposed opposite to the first guide.

The first guide may include a retainer provided on one of the first surface of the lens assembly and a surface of the housing, opposite to the first surface, a rolling member accommodated in the retainer and configured to roll inside the retainer, and a bearing surface provided on the other of the first surface of the lens assembly and the surface of the housing, opposite to the first surface, and configured to contact the rolling member.

The retainer may be extended to a predetermined length along an optical axis direction of the lens assembly, and may be a groove of a predetermined depth. Further, the rolling member may be a ball of a predetermined size or a roller. Further, the bearing surface may be configured to form a common plane with the first surface of the lens assembly. Further, the first guide may include a bearing member embedded into one of the first surface of the lens assembly and the surface of the housing, opposite to the first surface, to face the retainer, and having the bearing surface contacting the rolling member.

The second guide may include a first bearing extended from the second surface of the lens assembly toward the housing, and a second bearing provided in the housing, and configured to support a first surface of the first bearing.

The first and second bearings may be extended to a predetermined length along an optical axis direction of the lens assembly. The first surface of the first bearing and a second surface of the second bearing may be configured not to be parallel to the second surface of the lens assembly. More specifically, the first surface of the first bearing and a second surface of the second bearing may be oriented perpendicularly to the second surface of the lens assembly. Further, the second bearing may be extended to overlap with the first bearing.

The second guide may further include a rolling member disposed between the first bearing and the second bearing, and configured to roll in contact with the first surface of the first bearing and a second surface of the second bearing.

Further, the second guide may further include a retainer provided on one of the first surface of the first bearing and the second surface of the second bearing, and configured to accommodate the rolling member.

The actuator may include a magnet provided on the first surface of the lens assembly, and a coil provided in the housing, to face the magnet. The lens assembly may include a first recess that accommodates the magnet, and the housing may include a second recess that accommodates the coil.

The camera for an electronic device may further include a coupler configured to couple the first and second bearings to each other during relative movement by providing attractive force between the first and second bearings. The coupler may include a magnetic body disposed inside the first bearing, in the vicinity of the first surface of the first bearing, and a magnet disposed inside the second bearing, in the vicinity of the second surface of the second bearing, and attracting the magnetic body and the first bearing to the second bearing.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
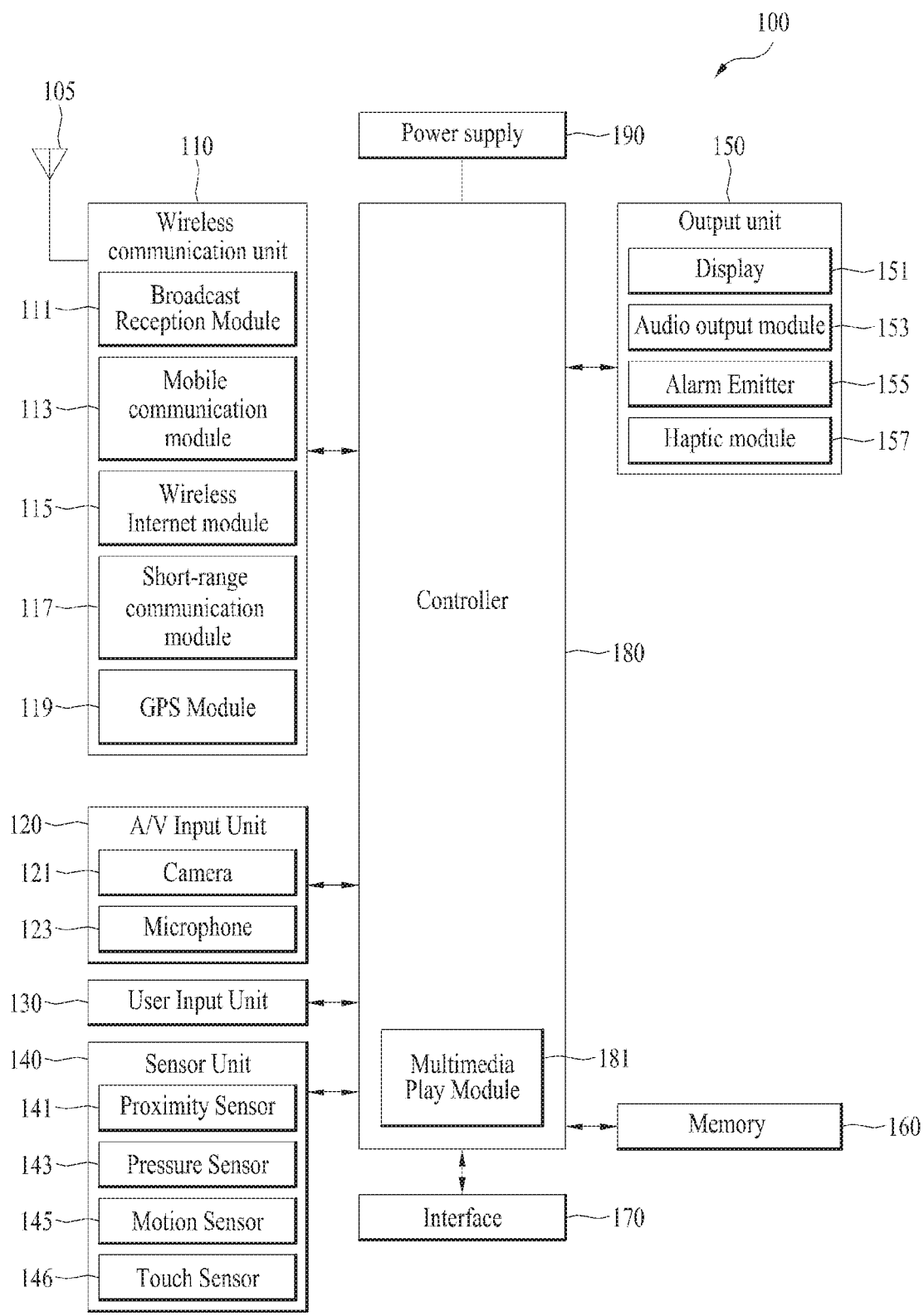
FIG. 1 is a block diagram illustrating a configuration of a mobile terminal as an exemplary electronic device including a camera according to the present disclosure.

Hereinafter, a camera for an electronic device according to the present disclosure will be described in detail with reference to the accompanying drawings.

In the following description, the same or similar elements are denoted by the same reference numerals even though they are depicted in different drawings and redundant descriptions thereof will be omitted. With respect to elements used in the following description, the suffixes "module" and "unit" are used or combined with each other only in consideration of ease in the preparation of the description, and do not have or serve as different meanings. Accordingly, the suffixes "module" and "unit" may be interchanged with each other. In addition, in the following description, a detailed description for known functions and configurations incorporated herein will be omitted when it may make the subject matter disclosed in the present disclosure rather unclear. In addition, the accompanying drawings are provided only for a better understanding of the examples in the present disclosure and are not intended to limit the technical concept in the present disclosure. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present disclosure, it will be further understood that the terms "comprises", includes," etc. specify the presence of stated features, numbers, steps, operations, elements, components, or combinations thereof, but do not preclude the presence or addition of one or more other features, numbers, steps, operations, elements, components, or combinations thereof. Further, for the same reasons, the present disclosure also covers any sub-combination excluding some features, integers, steps, operations, elements, or components from any predefined combination.

Embodiments described in the specification relate to a mobile terminal and a camera equipped in the mobile terminal. However, the principle and configurations of the described embodiments are applicable in the same manner to cameras of other electronic devices, for example, cameras of home appliances and other communication devices.

Figure 2A:
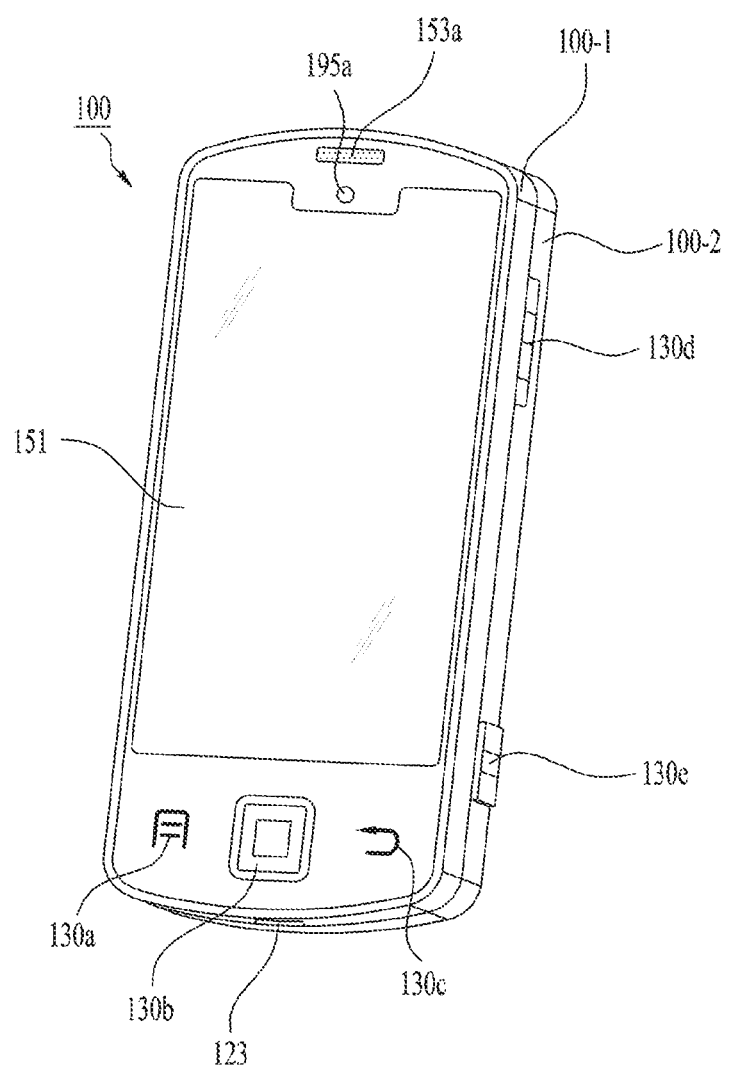
FIG. 2A is a front perspective view illustrating a mobile terminal as an exemplary electronic device including a camera according to the present disclosure.
Figure 2B:
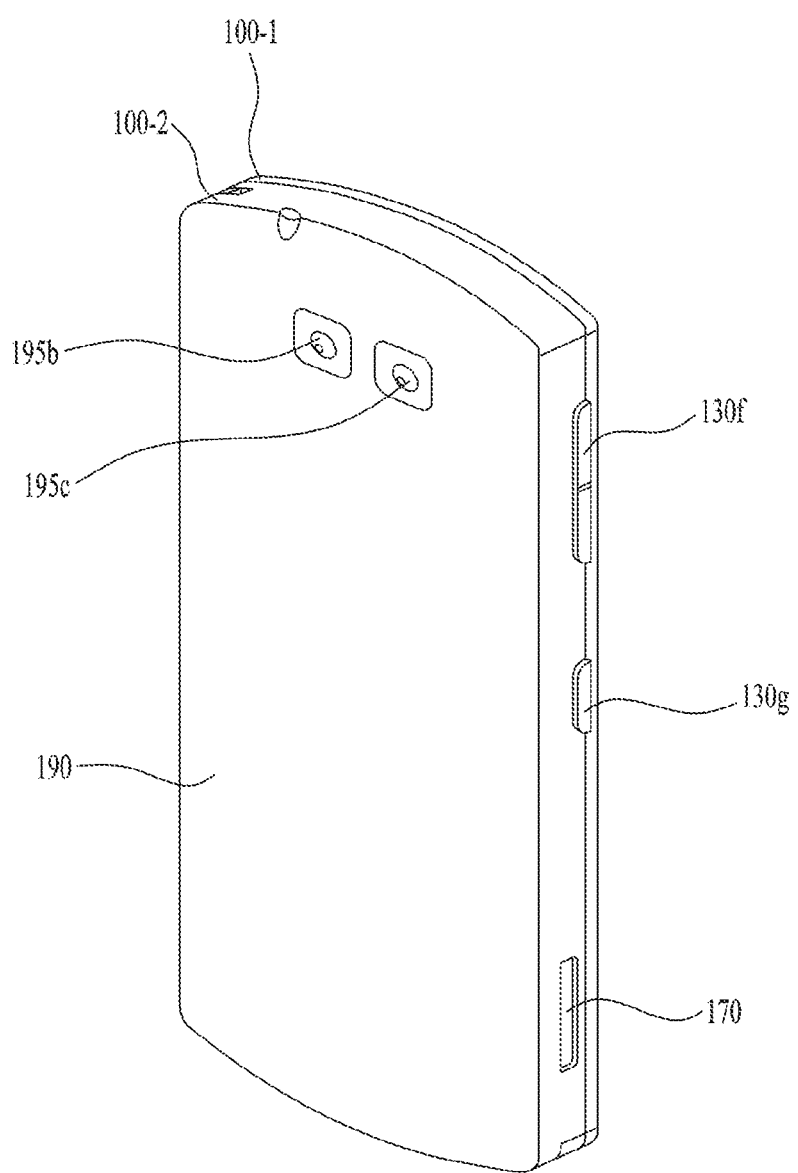
FIG. 2B is a rear perspective view illustrating the mobile terminal illustrated in FIG. 2A.

FIG. 1 is a block diagram illustrating a configuration of a mobile terminal as an exemplary electronic device including a camera according to the present disclosure. FIG. 2A is a front perspective view illustrating a mobile terminal as an exemplary electronic device including a camera according to the present disclosure, and FIG. 2B is a rear perspective view illustrating the mobile terminal illustrated in FIG. 2A. With reference to these drawings, the configurations of an exemplary camera and an exemplary electronic device equipped with the camera according to the present disclosure will first be described below in detail.

Referring to FIG. 1, a mobile terminal 100 may include a wireless communication unit 110, an audio/video (A/V) input unit 120, a user input unit 130, a sensor unit 140, an output unit 150, a memory 160, an interface unit 175, a controller 180, and a power supply 190. Two or more components of the mobile terminal 100 may be incorporated into a single component or a single component thereof may be separated into two or more components.

The wireless communication unit 110 may include a broadcasting reception module 111, a mobile communication module 113, a wireless Internet module 115, a short-range communication module 117, and a global positioning system (GPS) module 119.

The broadcasting reception module 111 may receive at least one of a broadcast signal or broadcasting-related information on a broadcast channel from an external broadcasting management server. The broadcast signal and/or broadcasting-related information received at the broadcasting reception module 111 may be stored in the memory 160.

The mobile communication module 113 may transmit a wireless signal to and receive a wireless signal from at least one of a base station (BS), an external terminal, or a server over a mobile communication network. The wireless signal may include a voice call signal, a video call signal, or various types of data involved in text/multimedia message transmission and reception.

The wireless Internet module 115 may be a built-in or external module in the mobile terminal 100, for providing wireless Internet connectivity to the mobile terminal 100.

The short-range communication module 117 is used for short-range communication. For short-range communication, the short-range communication module 117 may conform to Bluetooth, radio frequency identification (RFID), infrared data association (IrDA), ultra wideband (UWB), ZigBee, near field communication (NFC), and so on.

The GPS module 119 receives location information from a plurality of GPS satellites.

The A/V input unit 120 is used to receive an audio signal or a video signal, and may include a camera 121 and a microphone 123. The camera 121 in FIG. 1 corresponds to cameras 195a, 195b, and 195c as shown in FIGS. 2A and 2B (hereinafter, referred to as camera 195, collectively).

The camera 195 may process a video frame of a still image or video acquired from an image sensor in video call mode or camera mode. The processed video frame may be displayed on a display 151.

The video frame processed by the camera 195 may be stored in the memory 160 or transmitted externally through the wireless communication unit 110. Two or more cameras 195 may be provided to the mobile terminal 100 depending on the configuration specification of the mobile terminal 100.

The microphone 123 may receive an external audio signal and process the audio signal to electrical voice data in display-off mode, for example, in call mode, recording mode, or voice recognition mode.

A plurality of microphones 123 may be arranged at different positions. An audio signal received at each microphone may be subjected to audio signal processing in the controller 180 or the like.

The user input unit 130 generates key input data that the user inputs to control the operation of the mobile terminal 100. The user input unit 130 may include a keypad, a dome switch, a (resistive/capacitive) touch pad, or the like to receive a command or information through the user's push or touch manipulation. Particularly when a touch pad is layered with the display 151, the resulting structure may be referred to as a touch screen.

The sensor unit 140 may sense the current state of the mobile terminal 100, such as the open or closed state, position, or user touch of the mobile terminal 100, and generate a sensing signal to control the operation of the mobile terminal 100 according to the sensed state.

The sensor unit 140 may include a proximity sensor 141, a pressure sensor 143, a motion sensor 145, and a touch sensor 146.

The proximity sensor 141 may detect an object approaching the mobile terminal 100 or the existence or absence of an object in the vicinity of the mobile terminal 100 without mechanical contact. Particularly, the proximity sensor 141 may detect a nearby object based on a change in an alternating or static magnetic field or the variation rate of capacitance.

The pressure sensor 143 may determine whether pressure is applied to the mobile terminal 100 and how strong the pressure is.

The motion sensor 145 may sense the position or motion of the mobile terminal 100 using an accelerometer sensor, a gyro sensor, and so on.

The touch sensor 146 may sense a touch input applied by a user's finger or a specific pen. For example, if a touch screen panel is disposed on the display 151, the touch screen panel may be provided with the touch sensor 146 for sensing the position, strength, and so on of a touch input. A sensing signal sensed by the touch sensor 146 may be provided to the controller 180.

The output unit 150 outputs an audio signal, a video signal, or an alarm signal. The output unit 150 may include the display 151, an audio output module 153, an alarm emitter 155, a haptic module 157, and so on.

The display 151 displays information processed in the mobile terminal 100. For example, when the mobile terminal 100 is in the call mode, the display 151 displays a user interface (UI) or graphical user interface (GUI) related to a call. In the video call mode or the camera mode, the display 151 may display captured or received images separately or simultaneously, and may also display a UI or GUI.

As described before, if a touch screen is configured by layering the display 151 with a touch pad, the display 151 may be used not only as an output device but also as an input device capable of receiving information by a user's touch.

The audio output unit 153 may output audio data received from the wireless communication unit 110 or stored in the memory 160 in call termination mode, call mode, recording mode, voice recognition mode, or broadcast reception mode. The audio output module 153 also outputs an audio signal involved in a function performed by the mobile terminal 100, for example, an audio signal related to a call incoming sound, a message reception sound, or the like. The audio output module 153 may include a speaker, a buzzer, and so on.

The alarm emitter 155 outputs a signal notifying occurrence of an event in the mobile terminal 100. The alarm emitter 155 outputs an event notification signal in a form other than an audio signal or a video signal. For example, the event notification signal may be output in the form of vibrations.

The haptic module 157 generates various tactile effects that the user may feel. A major example of the tactile effects is vibrations. When the haptic module 157 generates vibrations as tactile effects, the intensity and pattern of the vibrations may be altered. The haptic module 157 may synthesize different vibration effects and output the synthesized vibrations. Alternatively, the haptic module 157 may output different vibration effects sequentially.

The memory 160 may store programs required for processing and controlling in the controller 180 or temporarily store input or output data (e.g. a phone book, a message, a still image, a video, and so on).

The interface 175 interfaces between the mobile terminal 100 and all external devices connected to the mobile terminal 100. The interface 175 may receive data or power from an external device and transfer the data or power to each component of the mobile terminal 100. In addition, the interface 175 may transmit data from the mobile terminal 100 to the external device.

The controller 180 typically provides overall control to the mobile terminal 100 by controlling the operation of each component. For example, the controller 180 controls and processes voice call, data communication, video call, and so on. The controller 180 may include a multimedia play module 181 for playing multimedia. The multimedia play module 181 may be configured in hardware inside the controller 180 or in software separately from the controller 180. The controller 180 may include an application processor (not shown) for executing applications. Alternatively, the AP may be configured separately from the controller 180.

The power supply 190 may receive power from an external power source or an internal power source and supply power to the other components of the mobile terminal 100, under the control of the controller 180.

FIGS. 2A and 2B illustrate an actual configuration of a mobile terminal including the basic components described above with reference to FIG. 1.

Referring to FIG. 2A, a case forming the exterior of the mobile terminal 100 includes a front case 100-1 and a rear case 100-2. Various electronic parts may be accommodated in a space defined by the front case 100-1 and the rear case 100-2.

Specifically, the display 151, a first audio output module 153a, a first camera 195a, and first, second, and third user input units 130a, 130b, and 130c may be arranged on the front case 100-1. A fourth user input unit 130d, a fifth user input 130e, and a microphone 123 may be arranged on side surfaces of the rear case 100-2.

As a touch pad is placed in a layered structure on the display 151, the display 151 may act as a touch screen.

The first audio output module 153a may be configured as a receiver or a speaker. The first camera 195a may be configured appropriately to capture an image or video of a user or the like. The microphone 123 may be configured appropriately to receive the user's voice or other sounds.

The first to fifth user input units 130a, 130b, 130c, 130d, and 130e, and later-described sixth and seventh user input units 130f and 130g may collectively be referred to as the user input unit 130.

The mobile terminal may include a plurality of microphones 123. Among such microphones 123, a first microphone (not shown) may be arranged on the top of the rear case 100-2, that is, on the top of the mobile terminal 100, to collect audio signals, and a second microphone (not shown) may be arranged on the bottom of the rear case 100-2, that is, on the bottom of the mobile terminal 100, to collect audio signals.

Referring to FIG. 2B, a second camera 195b, a third camera 195c, may additionally be installed on the rear surface of the rear case 100-2, and the sixth and seventh user input units 130f and 130g, and the interface 170 may be arranged on a side surface of the rear case 100-2.

The second camera 195b may have a capturing direction substantially opposite to that of the first camera 195a, and have a different number of pixels from that of the first camera 195a. A flash (not shown) and a mirror (not shown) may additionally be arranged in the vicinity of the second camera 195b. Further, another camera, that is, a third camera 195c may further be installed in the vicinity of the second camera 195b, for use in capturing a three-dimensional (3D) image.

A second audio output module (not shown) may further be provided on the rear case 100-2. The second audio output module may execute a stereo function along with the first audio output module 153a, and may also be used for a call in speaker phone mode.

The power supply unit 190 may be provided in the rear case 100-2, to supply power to the mobile terminal 100. The power supply 190 may be a rechargeable battery, and may be detachably coupled to the rear case 100-2, for charging or the like.

As described above, the mobile terminal which is an electronic device may include the first, second, and third cameras 195a, 195b, and 195c to acquire accurate information on an ambient environment, that is, an image of the ambient environment. Among these cameras, the first camera 195a is provided on the front of the mobile terminal 100 and thus may correspond to a front camera, and the second and third cameras 195b and 195c are provided on the rear of the mobile terminal 100 and thus may correspond to rear cameras. In the following description and the attached drawings, the first camera 195a is shown and described as a front camera 200, and the second and third cameras 195b and 195c are collectively shown and described as a rear camera 300.

Figure 3:
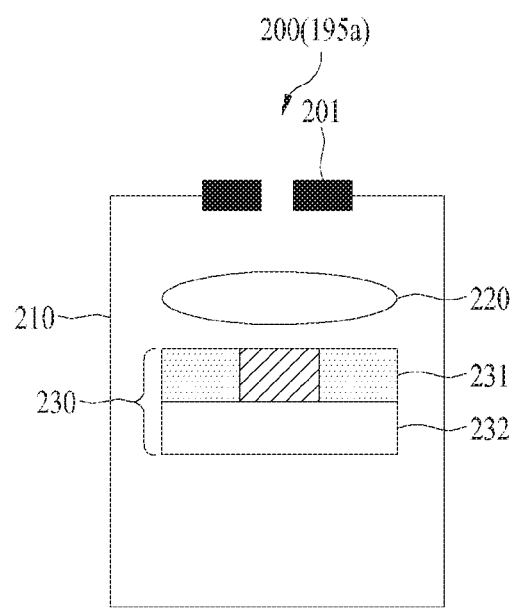
FIG. 3 is a schematic view illustrating a front camera according to the present disclosure.
Figure 4:
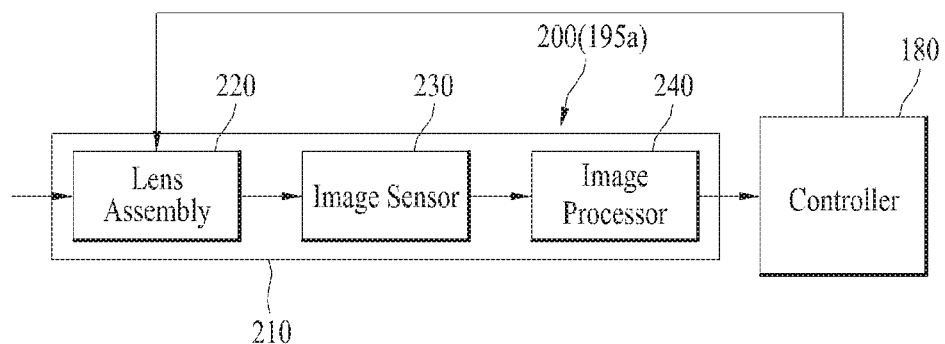
FIG. 4 is a block diagram illustrating the front camera illustrated in FIG. 3.
Figure 5A:
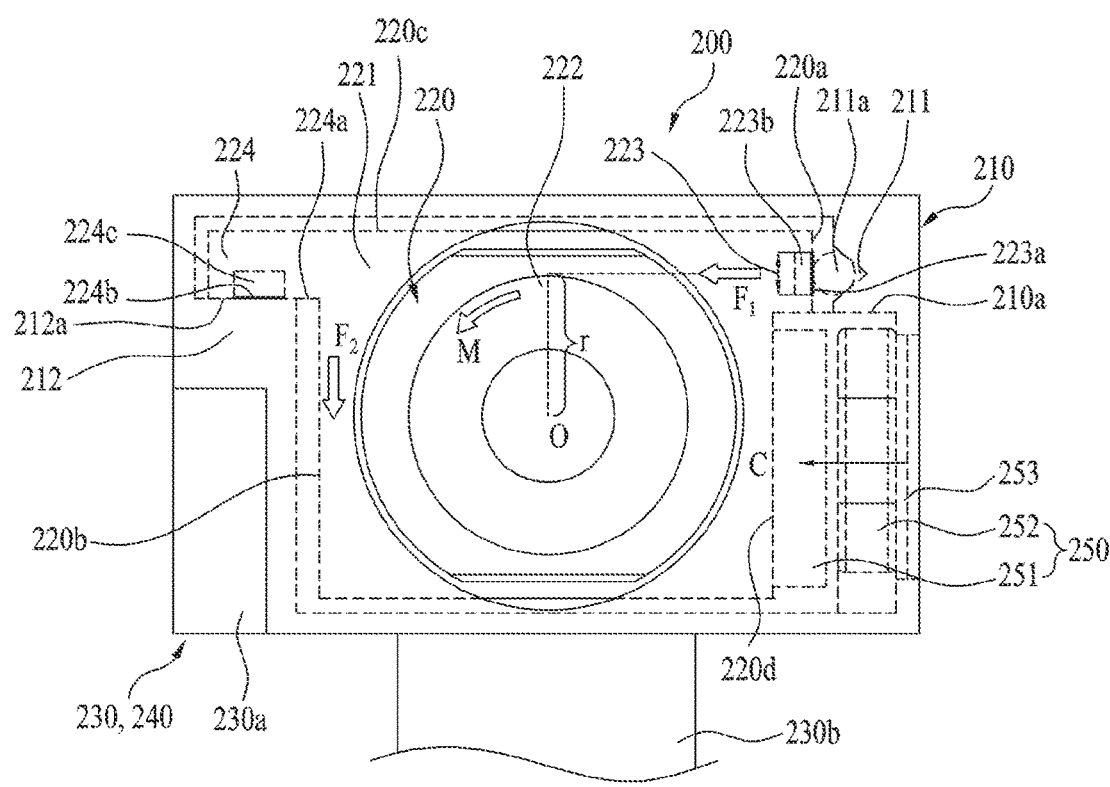
FIGS. 5A and 5B are a plan view and a perspective view illustrating an exemplary front camera according to the present disclosure, respectively.
Figure 5B:
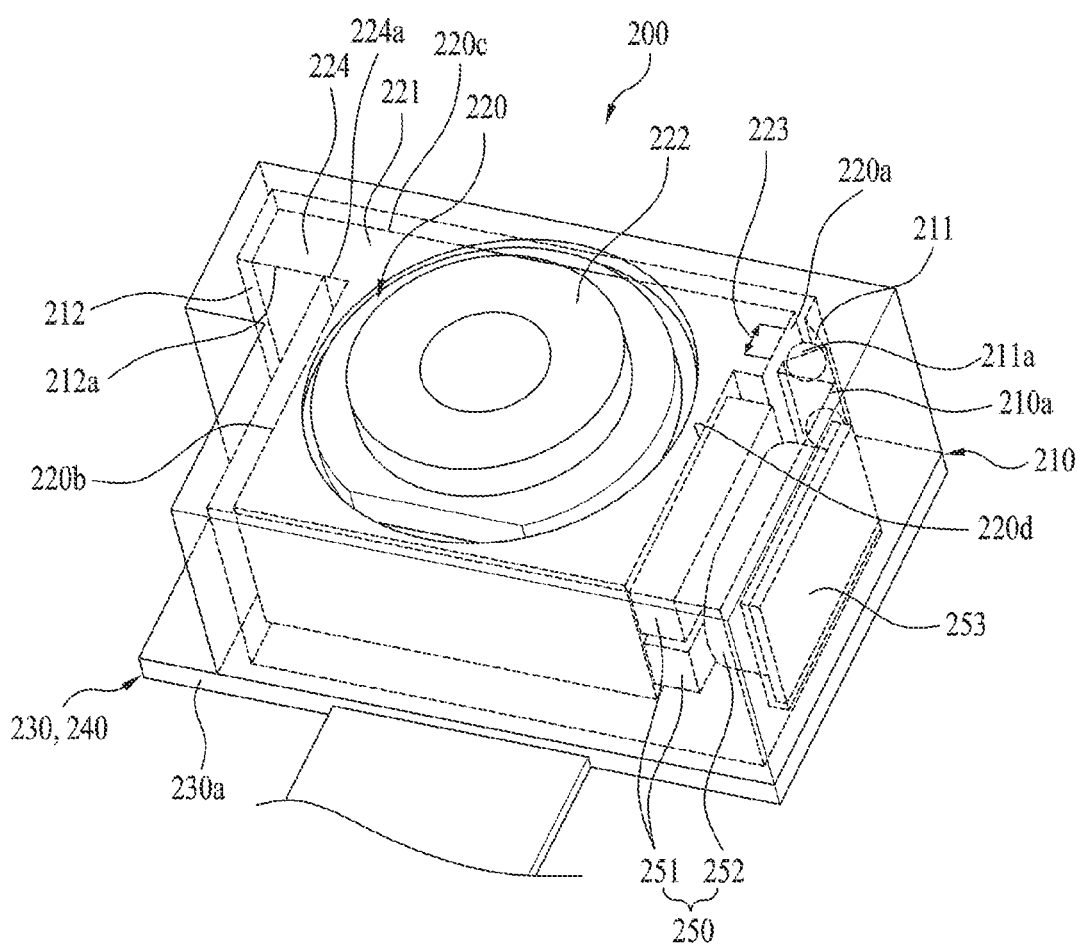

FIG. 3 is a schematic view illustrating a front camera according to the present disclosure, and FIG. 4 is a block diagram illustrating the front camera illustrated in FIG. 3. FIGS. 5A and 5B are a plan view and a perspective view illustrating an exemplary front camera according to the present disclosure, respectively. With reference to FIGS. 3 to 5B, a front camera according to the present disclosure will be described below in detail.

The front camera 200 may include a housing 210 with a space of a predetermined size formed therein. The housing 210 may accommodate various parts of the front camera 200 in the internal space, and may be configured to protect the parts. The housing 210 may include an opening to receive external light, for image acquisition, and an iris 201 may be mounted in the opening. The iris 201 may control the intensity of light incident on the front camera 200.

The front camera 200 may include a lens assembly 220 mounted inside the housing 210. The lens assembly 220 may be aligned with the opening of the housing 210, which is located relatively in front of the lens assembly 220, and may be configured to control the focus of incident light. As illustrated in FIGS. 5A and 5B, the lens assembly 220 may include a case 221 of a predetermined size and a lens 222 mounted inside the case 221. There may be a single or multiple lenses 222. The lens assembly 220 may be configured to control the focus of incident light and an image formed by the incident light. For control of the focus (or focal length), the lens assembly 220, that is, the case 221 and the lens 222 may be configured to be movable along a path in which light travels in the housing 210, that is, an optical path or optical axis. That is, the housing 210 is fixed for installation of the camera 200, whereas the lens assembly 220 may be a part inside the housing 210, which moves relative to the housing 210. Further, for focus control, the lens 222 may also be configured to be movable inside the case 221.

To stably move inside the housing 210, the lens assembly 220 needs to be supported by the housing 210. For the support, the lens assembly 220 may be formed into a shape matching the shape of the inner surface of the housing 210 on the whole. That is, the outer surface of the lens assembly 220 accommodated in the housing 210 may face the inner surface of the housing 210, to be supported. More specifically, the lens assembly 220 may include a plurality of different surfaces, that is, first and second surfaces 220a and 220b, which face the housing 210, or more exactly, the inner surface of the housing 210. For example, as illustrated in FIGS. 5A and 5B, if the lens assembly 220 is polygonal in section, the lens assembly 220 may include a plurality of distinct surfaces, and the first and second surfaces 220a and 220b may be a part of the plurality of surfaces. Alternatively, if the lens assembly 220 is not polygonal in section, for example, circular or oval in section, the continuous outer surfaces of the lens assembly 220 may be divided into at least the first and second surfaces 220a and 220b and further, more surfaces, according to a function of the lens assembly 220 or the position of the lens assembly 220 relative to the inner surface of the housing 210. The first and second surfaces 220a and 220b may be supported by the housing 210, or more exactly the inner surface of the housing 210 during movement of the lens assembly. Therefore, the movement of the lens assembly 220 may be guided stably.

Further, the front camera 200 may include an image sensor 230 configured to detect an image from light that has passed through the lens assembly 220. The image sensor 230 may be disposed in the vicinity of an output unit of the lens assembly 220, that is, behind the lens assembly 220 in the drawings in order to receive light focused by the lens assembly 220. The image sensor 230 may include a red, green, blue (RGB) filter 231 that senses RGB colors, and a sensor array 232 that converts an optical signal included in the foxed light into an electrical signal. As illustrated in FIGS. 5A and 5B, the front camera 200 may include a connector 230b that connects a board 230a (e.g., a printed circuit board (PCB)) disposed behind the lens assembly 220 to an internal control part of the mobile terminal 100, that is, the controller 180 (e.g., a processor). The image sensor 230 may be mounted on the board 230a such that the image sensor 230 faces the rear end, that is, output end of the lens assembly 220. Further, the front camera 200 may include an image processor 240, which may be mounted together with the image sensor 230 on the board 230a. The image processor 240 may generate an image by means of the electric signal detected from the image sensor 230. The generated image may be transmitted to the controller 180 via the connector 230b, and may additionally be processed in the controller 180, for a required function.

Further, as illustrated in FIGS. 5A and 5B, the front camera 200 may include an actuator 250 configured to move the lens assembly 220 relative to the fixed housing 210, for focus control. The actuator 250 may be configured to provide driving force to the lens assembly 220 so that the lens assembly 220 may actually move. The actuator 250 may adopt any of various mechanisms to provide the driving force, and may be, for example, a voice coil motor (VCM). The actuator 250 may include a magnet 251 that forms a magnetic field over a predetermined area, and a coil 252 disposed opposite to the magnet 251. When current is applied to the coil 252 disposed within the magnetic field of the magnet 251, force is generated between the magnet 251 and the coil 252, and the lens assembly 220 may make a linear motion with the force. The actuator 250 may be electrically coupled to the controller 180, and accordingly, the controller 180 may control the operation of the actuator 250. For example, the coil 252 may be coupled to the controller 180 by a separate wire. Alternatively, the coil 252 may be coupled to the controller 180 via the board 230a and the connector 230b. The controller 180 may control current applied to the coil via the electrical connection, thereby controlling the operation of the actuator 250. Therefore, the controller 180 may control the operation of the actuator 250 based on a distance to an object and other conditions as well as the quality of an image received from the image sensor 230 and the image processor 240, so as to move the lens assembly 220, for focus control.

The actuator 250, that is, parts thereof may be arranged separately in the lens assembly 220 and the housing 210 in order to enable smooth movement of the lens assembly 220. For example, as illustrated in FIGS. 5A and 5B, the actuator 250 may be disposed on a side surface of the lens assembly 220, that is, the first surface 220a and a part of the inner surface of the housing 210 facing the first surface 220a, that is, a part of the inner surface of the housing 210 opposite to the first surface 220a. More specifically, the magnet 251 of the actuator 250 may be mounted on the first surface 220a, and the coil 252 may be mounted on the part of the housing 210 opposite to the first surface 220a.

Further, the magnet 251 and the coil 252 are substantially bulky, thereby leading to an increase in the size of the front camera 200. Therefore, the actuator 250, that is, the magnet 251 and the coil 252 may be accommodated in the lens assembly 220 and the housing 210, without protruding from the lens assembly 220 and the housing 210. More specifically, the front camera 200 may include a first recess 220d formed on a side part or side surface of the lens assembly 220, that is, on the first surface 220a, and a second recess 210a formed on a part of the housing 210 opposite to the first recess 220d. The magnet 251 and the coil 252 may be accommodated in the first and second recesses 220d and 210a, respectively, without protruding from the first and second recesses 220d and 210a. Therefore, the actuator 250 may be mounted in the front camera 200 without increasing the spacing between the housing 210 and the lens assembly 220, thereby maintaining the front camera 200 compact in size. Further, the actuator 250 may further include a magnetic body 253 mounted in the housing 210, in the vicinity of the coil 252. The magnetic body 253 may be disposed between the coil 252 and a part of the housing 251, not between the magnet 251 and the coil 252, in order not to interfere with the operation of the actuator 250. That is, the coil 252 may be disposed between the magnet 251 and the magnetic body 253. The magnetic body 253 within the magnetic field of the magnet 251 is attracted toward the magnet 251, as indicated by an arrow in FIG. 5A, and thus coupling force C may be provided between the lens assembly 220 with the magnet 351 mounted therein and the housing 210 with the magnetic body 253 mounted therein.

As described before, the lens assembly 220 may move relative to the fixed housing 210, for focus control. During the relative movement, however, frictional force may be generated between the lens assembly 220 and the housing 210. Moreover, various forces may be exerted to the lens assembly 220, thus obstructing the relative movement of the lens assembly 220. To stably guide the relative movement of the lens assembly 220 under these conditions, the front camera 200 may include a guide in the lens assembly 220 and the housing 210. The guide for guiding the relative movement may be configured to support the outer surfaces of the lens assembly 220 with respect to the housing 210.

The guide may be installed in various parts of the lens assembly 220 and the housing 210. However, since the guide itself also has a predetermined size, it is important to install the guide without increasing the size of the front camera 200. As described before, the actuator 250 is mounted on the first surface 220a of the lens assembly 220 and the surface of the housing 210 opposite to the first surface 220a, occupying a specific space in the vicinity of the first surface 220a. Therefore, if the guide is provided in the vicinity of the first surface 220a to support the first surface 220a, additional expansion of the front camera 220 for the guide may be suppressed. For this reason, the front camera 220 may include, as the guide, a first guide 211 and 223 configured to support the first surface 220a of the lens assembly 220 with respect to the housing 210. The first guide 211 and 223 is close to the actuator 250 disposed on the first surface 220a, and may guide the lens assembly 220, or more exactly the first surface 220a of the lens assembly 220 to move relative to the housing 210.

More specifically, the first guide may include a retainer 211 provided on one of the first surface 220a of the lens assembly 220 and the surface of the housing 210 facing the first surface 220a. For example, in the first guide illustrated in FIGS. 5A and 5B, the retainer 211 is formed on a part of the surface of the housing 210 opposite to the first surface 220a. The retainer 211 may be a groove of a predetermined depth. The retainer 211 may be extended to a predetermined length along an optical axis direction of the front camera 200 or the lens assembly 220. Further, the retainer 211 may be formed on the inner surface of the housing 210, continuously from the front end to the rear end of the housing 210 in the drawings.

Further, the first guide may include a rolling member 211a accommodated in the retainer 211. As illustrated in FIGS. 5A and 5B, the rolling member 211a may be a ball of a predetermined size. Alternatively, the rolling member 211a may be a roller. The rolling member 211a may protrude from the retainer 211, to contact the first surface 220a, and may be configured to roll inside the retainer 211.

Further, the first guide may include a bearing surface 223 on the other of the first surface 220a of the lens assembly 220 and the surface of the housing 210 opposite to the first surface 220a. Further, the bearing surface 223 may be configured to contact the rolling member 211a, for guiding the relative movement of the lens assembly 220. As described before, if the retainer 211 illustrated in FIGS. 5A and 5B is formed, for example, on a part of the surface of the housing 210 opposite to the first surface 220a, the bearing surface 223 may be provided on the first surface 220a, to face the retainer 211. In FIGS. 5A and 5B, the bearing surface 223 is indicated by a guide line and an arrow, distinguishably from the first surface 220a. The bearing surface 223 may be a part of the first surface 220a, that is, a part of the lens assembly 220. Therefore, the bearing surface 223 may be formed of the same material as the lens assembly 220, or more exactly the case 221 of the lens assembly 220. Further, the bearing surface 223 may include a layer 223a provided on the first surface 220a, as indicated by a bold line. The layer 223a may be exposed from the first surface 220a, and formed of a material with higher strength and lubricability than at least the case 221. Therefore, the bearing surface 223 may generate less frictional force with respect to the rolling member 211a, and may not be broken even against repeated contact and rolling of the rolling member 211a. Further, as indicated by a dotted line in FIG. 5A, the first guide may include a bearing member 223b embedded into one of the first surface 220a of the lens assembly 220 and the surface of the housing 210 opposite to the first surface 220a, to face the retainer 211. Since the retainer 211 is provided, for example, in the housing 210 in FIGS. 5A and 5B, the bearing member 223b may be embedded into the first surface 220a. One surface of the bearing member 223b may be exposed from the first surface 220a, to contact the rolling member 221a, thereby forming the bearing surface 223. For reduced frictional force and breakage prevention, the bearing member 223b may also be formed of a material with high strength and lubricability, like the layer 223a. This bearing surface 223 may form a common plane with the first surface 220a of the lens assembly 220. Alternatively, the bearing surface 223 may protrude from the first surface 220a, and have an increased strength due to the resulting thickness increase. That is, the bearing surface 223 may be configured not to accommodate the rolling member 211a.

While the lens assembly 220 is moving, the rolling member 211a may make a rolling motion inside the retainer 211 of the housing 210, in contact with the bearing surface 223 of the lens assembly 220. Therefore, the first guide may stably support the first surface 220a of the lens assembly 220, thereby smoothly guiding the movement of the lens assembly 220.

Considering the whole size of the front camera 200, the lens assembly 220 has a substantially large size. Thus, for stable movement, an additional guide needs to be included. Since the first guide is already disposed on the first surface 220a as described before, it is difficult to install an additional guide on the first surface 220a. Moreover, if the additional guide is provided to guide a top surface 220c of the lens assembly 220, this may result in expansion of both of the top and a side of the front camera 200. If the additional guide is disposed in the vicinity of the other side surface 220b opposite to the first surface 220a which is a side surface of the lens assembly 220, the lens assembly 220 is expanded only at the side parts thereof, not at the top and bottom thereof. Therefore, despite the installation of the additional guide, the distance between the top and bottom of the camera 200, that is, the thickness or height of the front camera 200 may still be kept small, which may facilitate installation of front camera 200 in a compact mobile terminal and other electronic devices. For this reason, the front camera 200 may include a second guide 224 and 212 as the additional guide, which is configured to support the other side surface opposite to the first surface 220a of the lens assembly 220, that is, the second surface 220b with respect to the housing 210. That is, the second surface 220b is neither close to the first surface 220a nor coupled to the first surface 220a. The second surface 220b corresponds to the surface opposite to the first surface 220a, and as the second guide 224 and 212 supports the second surface 220b, the second guide 224 and 212 may be disposed opposite to the first guide. The second guide 224 and 212 may guide the lens assembly 220, or more exactly the second surface 220b thereof to make a motion relative to the housing 210.

Besides the above positioning, distribution of force generated inside the front camera 200 may additionally be considered for the specific configuration of the second guide. Because the housing 210 is firmly fixed to the mobile terminal 100, the moving lens assembly 220 may receive reaction force relatively from the housing 210 due to the support of the first guide. More specifically, as illustrated in FIGS. 5A and 5B, in the first guide, the first surface 220a is supported by the rolling member 211a, and thus the lens assembly 220 may receive reaction force $F_1$ applied relatively to a support point, that is, the rolling member 221a in an arrowed direction. The applied reaction force $F_1$ may generate a moment M by an arm length r with respect to the center O of the front camera 200 or the lens assembly 220, and the moment M may result in actual application of force $F_2$ in parallel to the second surface 220b as indicated by an arrow. The force $F_2$ is exerted as a kind of rotational force, thereby rotating the lens assembly 220 with respect to the center O, and making a linear motion of the lens assembly 220 unstable along the optical axis. To prevent the rotation of the lens assembly 220, the second guide needs to include a support configured to stably support the force $F_2$.

The second guide may include, as the support, a first bearing 224 extended from the second surface 220b of the lens assembly 210 toward the housing 210. Further, the second guide may include a second bearing 212 formed in the housing 210 and configured to support the first bearing 224. More specifically, the second bearing 212 may be extended from the inner surface of the second housing 210 toward the second surface 220b of the lens assembly 220. Further, it may be said that the second bearing 212 is extended from the housing 210 toward the first bearing 224. The second bearing 212 may overlap with the first bearing 224 in order to support the extended first bearing 224. More specifically, the first and second bearings 224 and 212 may include first and second surfaces 224a and 212a facing each other, respectively, and the first and second surfaces 224a and 212a may contact each other, for mutual support. The first surface 224a of the first bearing 224 may correspond to an extension or part of the second surface 220b of the lens assembly 220, and the second surface 212a of the second bearing 212 may correspond to an extension or part of the housing 210 or the inner surface of the housing 210. That is, the first and second bearings 224 and 212 may be brought in direct surface contact through the first and second surfaces 224a and 212a so as to support the second surface 220b of the lens assembly 220 with respect to the housing 210, and the first and second surfaces 224a and 212a may act as a kind of bearing surfaces.

As discussed before, since the force $F_2$ is applied in parallel to the second surface 220b, if the first and second bearings 224 and 212 are oriented in a direction transverse to the second surface 220b, the first and second bearings 224 and 212 may appropriately support the force $F_2$. For this reason, the first and second bearings 224 and 212 may be extended and oriented in a direction other than a direction parallel to the second surface 220b. Further, the first and second surfaces 224a and 212a included in these bearings 224 and 212 may also be extended in a direction other than the direction parallel to the second surface 220b, in order to support the force $F_2$. Further, the first and second bearings 224 and 212 may be extended and oriented substantially perpendicularly to the second surface 220b. Likewise, the first and second surfaces 224a and 212a may also be extended and oriented substantially perpendicularly to the second surface 220b. In view of the perpendicular orientation, the second guide may support the force $F_2$ more firmly so that rotation may not take place. As illustrated in FIGS. 5A and 5B, the second guide, that is, the first and second bearings 224 and 212 may be arranged at the same height as that of the first guide 211 and 223 in the drawings. That is, like the first guide 211 and 223, the second guide 224 and 212 may be disposed in an upper part of the lens assembly 220. More specifically, the second guide 224 and 212 and the first guide 211 and 223 may be arranged in upper parts of both side parts or both side surfaces 220a and 220b of the lens assembly 220, respectively. In view of this arrangement, the second guide 224 and 212 may more firmly support the reaction force $F_1$ applied from the first guide 211 and 233.

More specifically, the first bearing 224 may be extended to a predetermined length along the optical axis direction of the front camera 200 or the lens assembly 220. In the drawings, the first bearing 224 may be formed continuously from the front end to the rear end of the lens assembly 220, or more exactly the case 212 of the lens assembly 220. Likewise, the second bearing 212 may also be extended to a predetermined length along the optical axis direction of the front camera 200 or the lens assembly 220. In the drawings, the second bearing 212 may be formed continuously from the front end to the rear end of the housing 210. For example, considering the configuration illustrated in FIGS. 5A and 5B, the first bearing 224 may be a first arm extended from the second surface 220b toward the housing 210, and the second bearing 212 may be a second arm or stepped portion, which is extended from the inner surface of the housing 210 toward the second surface 220b.

Further, the first surface 224a may include a layer 224b, as indicated by a bold line in FIG. 5A. The layer 224b may be exposed from the first surface 224a and formed of a material with high strength and lubricability. Therefore, the first bearing 224 may move smoothly on the second bearing 212 due to reduced frictional force, and have a strength enough to withstand repeated friction with the second bearing 212. Further, as indicated by a dotted line in FIG. 5A, the first bearing 224 may include a bearing member 224c embedded into the first surface 224a. One surface of the bearing member 224c may be exposed from the first surface 224a to contact the second surface 212a of the second bearing 212, thereby forming a bearing surface. For reduced frictional force and breakage prevention, the bearing member 224c may also be formed of a material with high strength and lubricability, like the layer 224b. The layer 224b and the bearing member 224c may be provided to the second bearing 212, instead of the first bearing 224. Further, the layer 224b and the bearing member 224c may be provided to both of the first and second bearings 224 and 212.

Figure 6:
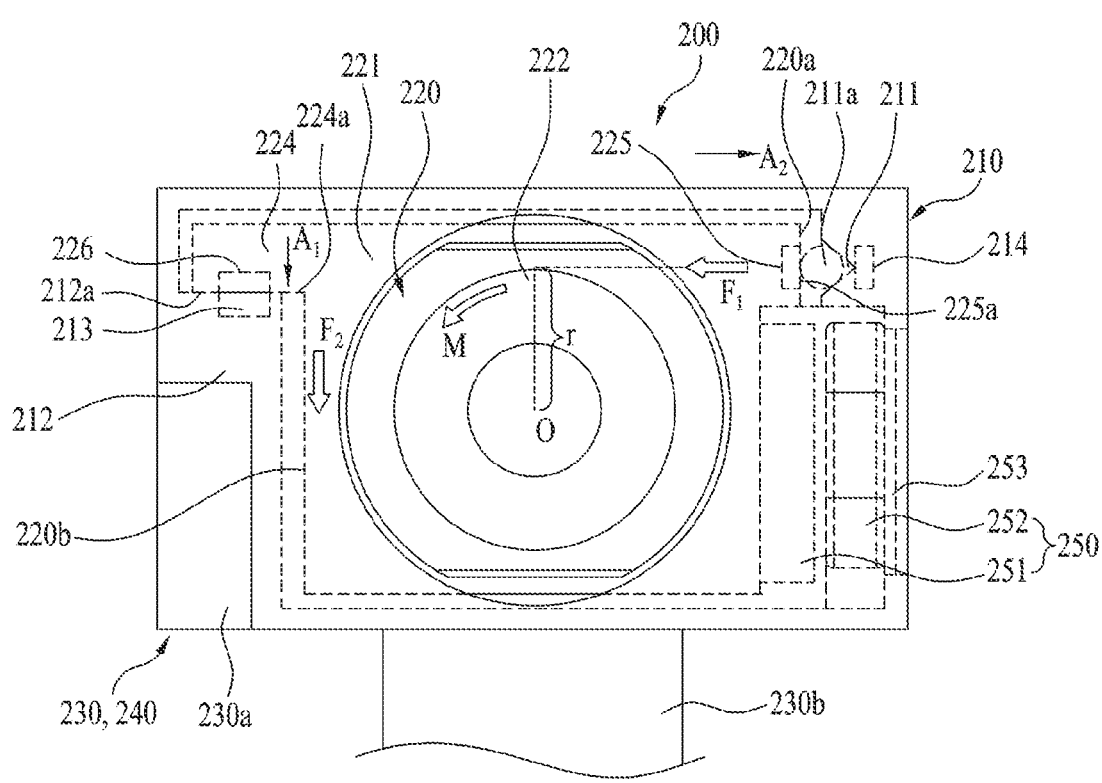
FIGS. 6, 7, and 8 are detailed plan views illustrating first and second guides in the front camera illustrated in FIGS. 5A and 5B.

Further, although the first and second bearings 224 and 212 are configured to support each other in mutual contact in the second guide, the first and second bearings 224 and 212 may be separated from each other by strong impact applied to the front camera 200. In this case, the first and second bearings 224 and 212 may not stably support the moving lens assembly 220. As illustrated in FIG. 6, therefore, the front camera 200 may further include a coupler configured to couple the first and second bearings 224 and 212 to each other during relative movement.

Any of various mechanisms may be applied as the coupler to provide coupling force between the first and second bearings 224 and 212. However, since most mechanisms are substantially large in size and complex in structure, they are not feasible for application to the compact front camera 200. Accordingly, the coupler may be configured to provide attractive force between the first and second bearings 224 and 212 without mechanical engagement. For this purpose, the coupler may include a magnet 213 that generates attractive force by a magnetic field and a magnetic body 226 that is attracted by the magnet 213. The coupler 213 and 226 may be configured to attract the first bearing 224 to the second bearing 212 or to attract the second bearing 212 to the first bearing 224. However, to stably attract the moving first bearing 224 (i.e., the moving lens assembly 220) to the fixed second bearing 212 (i.e., the housing 210) and couple the first bearing 224 to the second bearing 212 may be more favorable for stable movement of the lens assembly 220.

For this reason, the coupler may include the magnetic body 226 disposed inside the first bearing 224, in the vicinity of the first surface 224a of the first bearing 224, and the magnet 213 disposed inside the second bearing 212, in the vicinity of the second surface 212a of the second bearing 212. The magnetic body 226 is formed of a material magnetized by a nearby magnetic field, such as iron, and has the feature of being attracted to the magnetic field. Therefore, the magnet 213 together with the magnetic body 226 may attract the first bearing 224 to the second bearing 212. That is, as indicated by an arrow, the coupler may provide coupling force $A_1$ exerted from the first bearing 224 toward the second bearing 212. For this reason, the first bearing 224 may be firmly coupled to the second bearing 212, and thus the first bearing 224 may not be separated from the second bearing 212 even against external impact. Further, the magnetic body 226 may be formed of a material with lubricability and high strength as well as ferromagnetism. In this case, the magnetic body 226 may substitute for the layer 224b and the bearing member 224c of the first bearing 224, which have been described before with reference to FIG. 5A, for the same function.

Further, for the same reason, an auxiliary coupler having a similar function to that of the afore-described coupler 213 and 226 may be applied to the first guide, as illustrated in FIG. 6. Similarly to the coupler 213 and 226, the auxiliary coupler may be configured to couple the first surface 220a of the lens assembly 220 to the nearby inner surface of the housing 210 during relative movement, and may include a magnet 214 that generates attractive force between the first surface 220a, or more exactly the bearing surface 223 and the inner surface of the housing 210 by a magnetic field, and a magnetic body 225 that is attracted by the magnet 214.

As described before, the reaction force $F_1$ may be applied to the first surface 220a, that is, the bearing surface 223, to thereby cause unstable rotation. If the auxiliary coupler 214 and 225 is configured to attract the bearing surface 223 toward the housing 210, coupling force $A_2$ applied in an arrowed direction may be generated. Since this coupling force $A_2$ is exerted in the opposite direction to the reaction force $F_1$, the coupling force $A_2$ may counterbalance the reaction force $F_1$, thereby reducing the moment M that causes rotation. Accordingly, the auxiliary coupler 214 and 225 may be configured to generate the coupling force $A_2$ opposite to the reaction force $F_1$. Further, since this configuration stably couples the moving first surface 220a/bearing surface 223 (i.e., the lens assembly 22) with the fixed housing 210, the configuration may be more feasible for stable movement of the lens assembly 220.

For this reason, the auxiliary coupler may include the magnetic body 225 disposed in the vicinity of the first surface 220a (i.e., the bearing surface 223) and the magnet 214 disposed in the vicinity of the retainer 211 in the housing 210. The magnet 214 together with the magnetic body 225 may attract the first surface 220a (i.e., the bearing surface 223) to the housing 210. That is, as indicated by the arrow, the auxiliary coupler may provide the coupling force $A_2$ exerted from the first surface 220a/the bearing surface 223, that is, the lens assembly 220 to the housing 210. Therefore, in the first guide, the first surface 220a (i.e., the bearing surface 223) may be firmly coupled to the facing inner surface of the housing 210, thereby not being separated from the inner surface of the housing 210 even against external impact. Further, the magnetic body 225 may be formed of a material with lubricability and high strength as well as ferromagnetism. In this case, the magnetic body 225 may substitute for the layer 223a and the bearing member 223b of the bearing surface 223, which have been described before with reference to FIG. 5A, for the same function.

Figure 7:
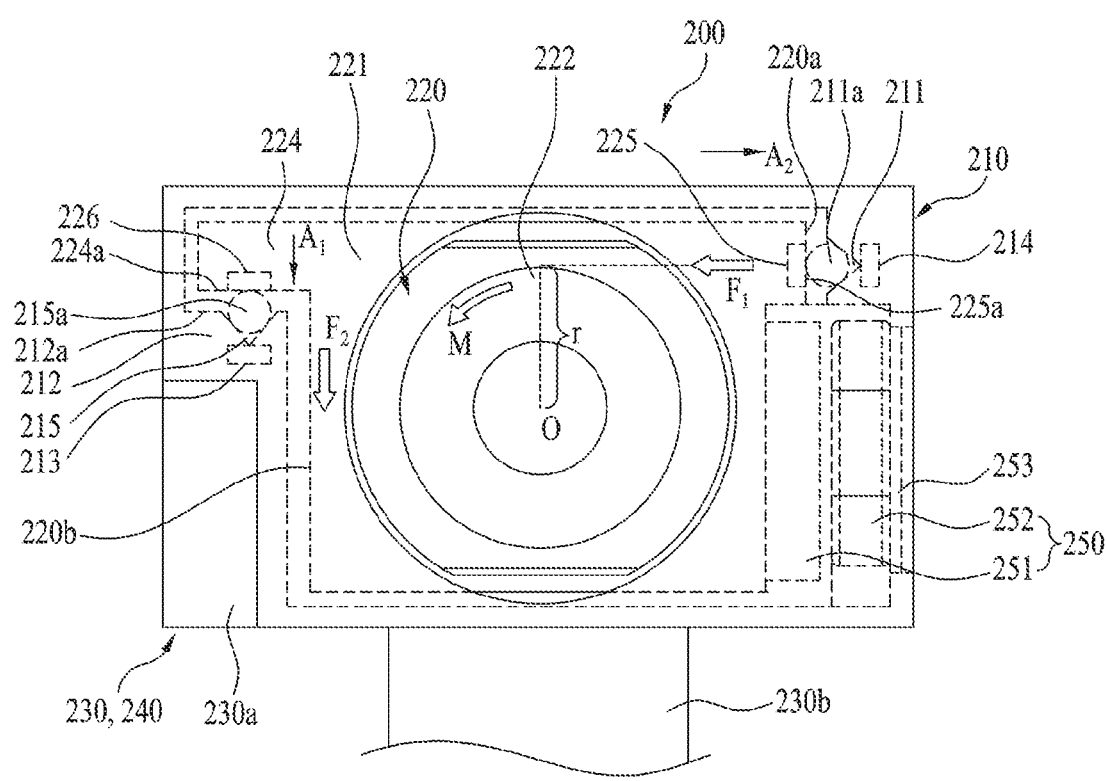

Further, as illustrated in FIG. 7, the second guide may further include a retainer 215 on one of the first surface 224a of the first bearing 224 and the second surface 212a of the second bearing 212 opposite to the first surface 224a. For example, in the second guide illustrated in FIG. 7, the retainer 215 may be formed on the second surface 212a. The retainer 215 may be a groove of a predetermined depth. The inner surface of the retainer 215 may also be formed as a part of the second surface 212a. This retainer 215 is extended to a predetermined length along the optical axis direction of the front camera 200 or the lens assembly 220. In the drawings, the retainer 215 may be formed continuously from the front end to the rear end of the housing 210 or the second bearing 212.

Further, the second guide may further include a rolling member 215a disposed between the first bearing 224 and the second bearing 212, and configured to contact the first surface 224 and the second surface 212a. More specifically, the rolling member 215a may be accommodated in the retainer 215, contact the inner surface of the retainer 215, that is, the second surface 212a, and protrude outward from the retainer 215 to contact the first surface 224a. This rolling member 215a may more smoothly guide the movement of the lens assembly 220, supporting the first surface 224a of the first bearing 224, that is, the second surface 220b of the lens assembly 220, while rolling in the retainer 215. In this second guide, the magnet 213 of the coupler may be disposed inside the housing 210, in the vicinity of the retainer 215.

Figure 8:
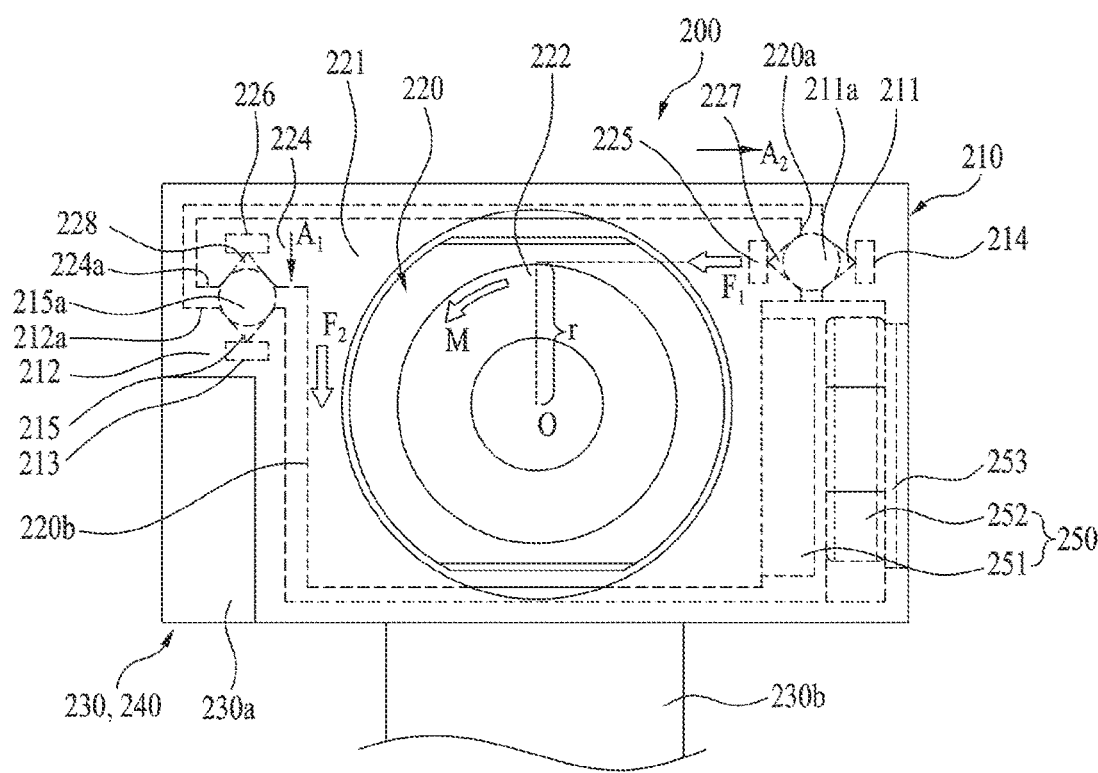

Further, referring to FIG. 8, the first guide may further include an additional retainer 227 formed on the first surface 220a, on behalf of the bearing surface 223. The additional retainer 227 may be disposed to face the retainer 211, and may be a groove of a predetermined depth, like the retainer 211. The additional retainer 227 may be extended to a predetermined length along the optical axis direction of the front camera 200 or the lens assembly 220. In the drawing, the additional retainer 227 may be formed continuously from the front end to the rear end of the lens assembly 220, that is, the first surface 220a. The additional retainer 227 may accommodate a part of the rolling member 221a protruding from the retainer 211, and the rolling member 211a may contact the inner surfaces of both of the retainers 211 and 227. As the rolling member 211a is accommodated in both of the retainers 211 and 227, the rolling member 211a may make a more stable rolling motion, thereby enabling more stable support and guidance of movement. In this first guide, the magnetic body 225 of the auxiliary coupler may be disposed inside the lens assembly 220, in the vicinity of the additional retainer 227.

Further, the second guide may further include an additional retainer 228 formed on the first surface 224a of the first bearing surface 224. The additional retainer 228 may be disposed to face the retainer 215, and may be a groove of a predetermined depth, like the retainer 215. The additional retainer 228 may be extended to a predetermined length along the optical axis direction of the front camera 200 or the lens assembly 220. In the drawing, the additional retainer 228 may be formed continuously from the front end to the rear end of the first bearing 224, that is, the first surface 224a. The additional retainer 228 may accommodate a part of the rolling member 215a protruding from the retainer 215, and the rolling member 215a may contact the inner surfaces of both of the retainers 215 and 228. As the rolling member 215a is accommodated in both of the retainers 215 and 228, the rolling member 215a may make a more stable rolling motion, thereby enabling more stable support and guidance of movement. In this second guide, the magnetic body 226 of the coupler may be disposed inside the lens assembly 220, that is, the first bearing 224, in the vicinity of the additional retainer 228.

In addition to the afore-described front camera 200, the mobile terminal 100 includes the second and third cameras 195b and 195c arranged on the rear thereof, that is, the rear camera 300. The configuration of the rear camera 300 will be described below in detail with reference to related drawings.

Figure 9:
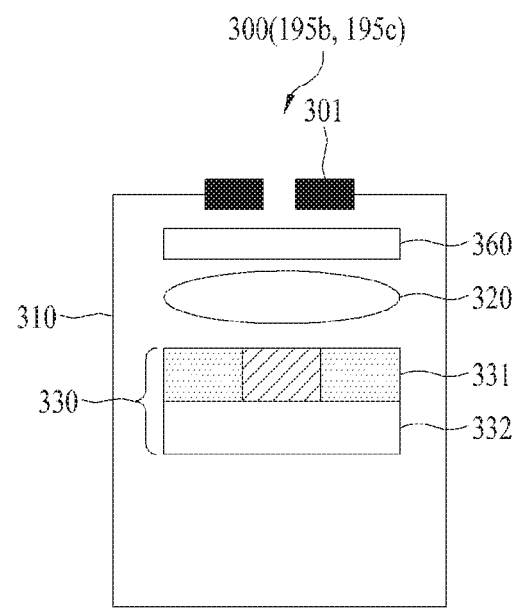
FIG. 9 is a schematic view illustrating a rear camera according to the present disclosure.
Figure 10:
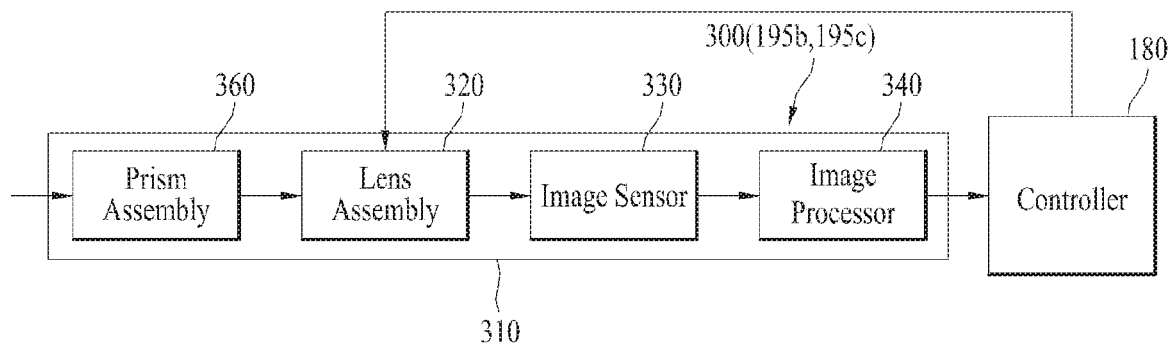
FIG. 10 is a block diagram illustrating the rear camera illustrated in FIG. 9.
Figure 11:
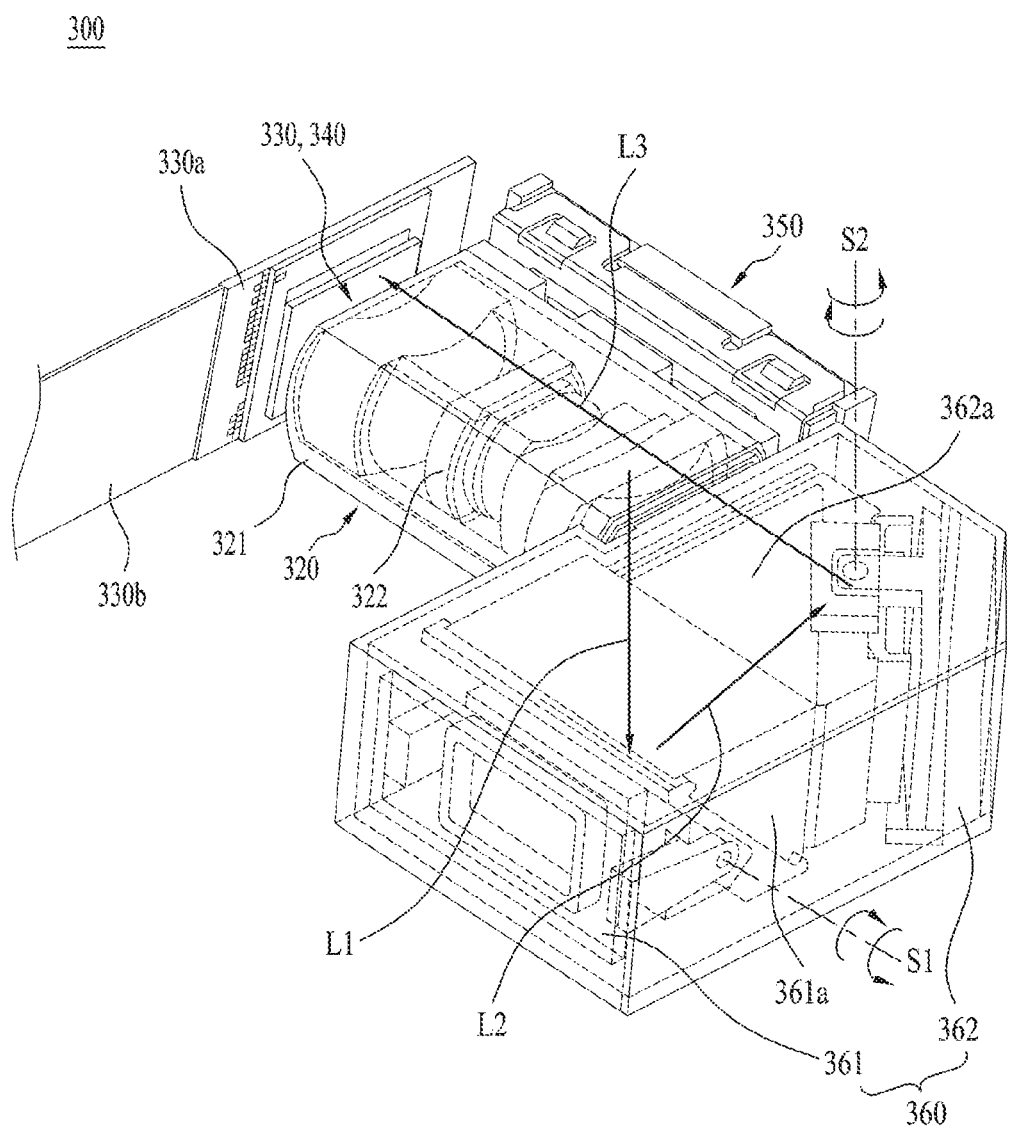
FIGS. 11 and 12 are a perspective view and an exploded perspective view illustrating the rear camera illustrated in FIG. 9, respectively.
Figure 12:
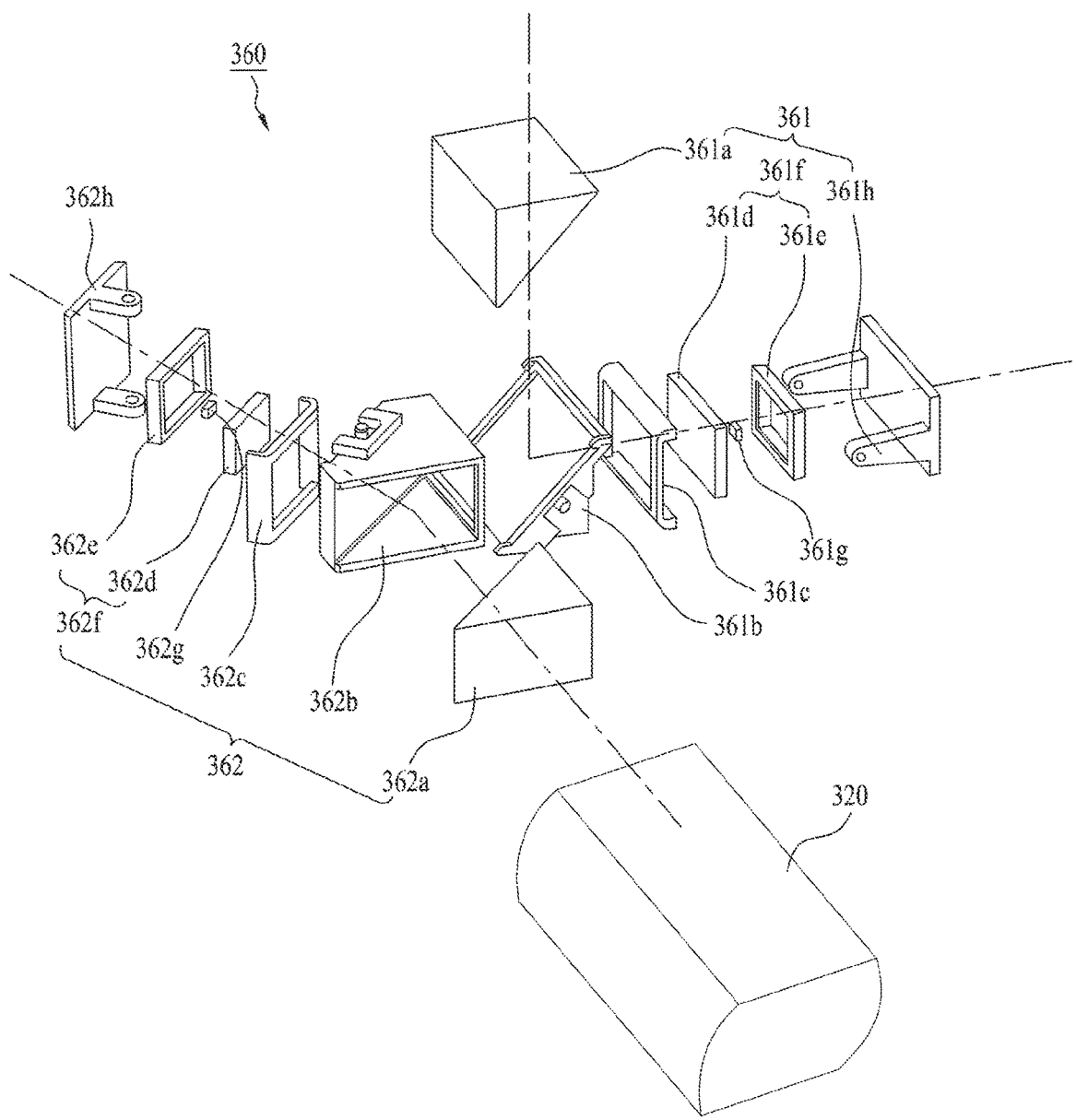
Figure 13A:
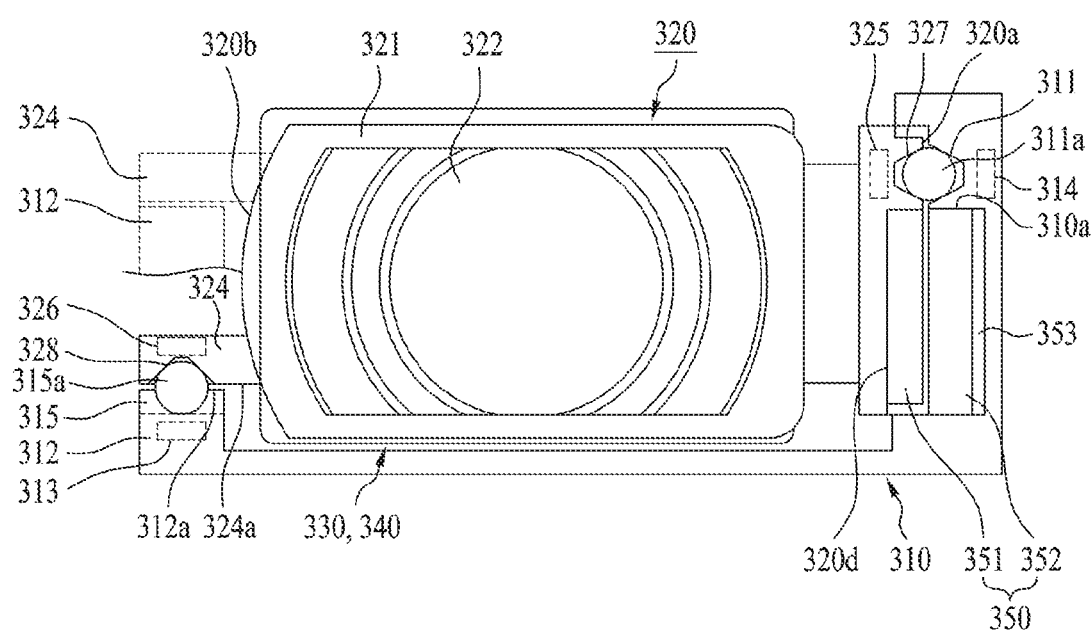
FIGS. 13A and 13B are a plane view and a perspective view illustrating an exemplary rear camera according to the present disclosure.
Figure 13B:
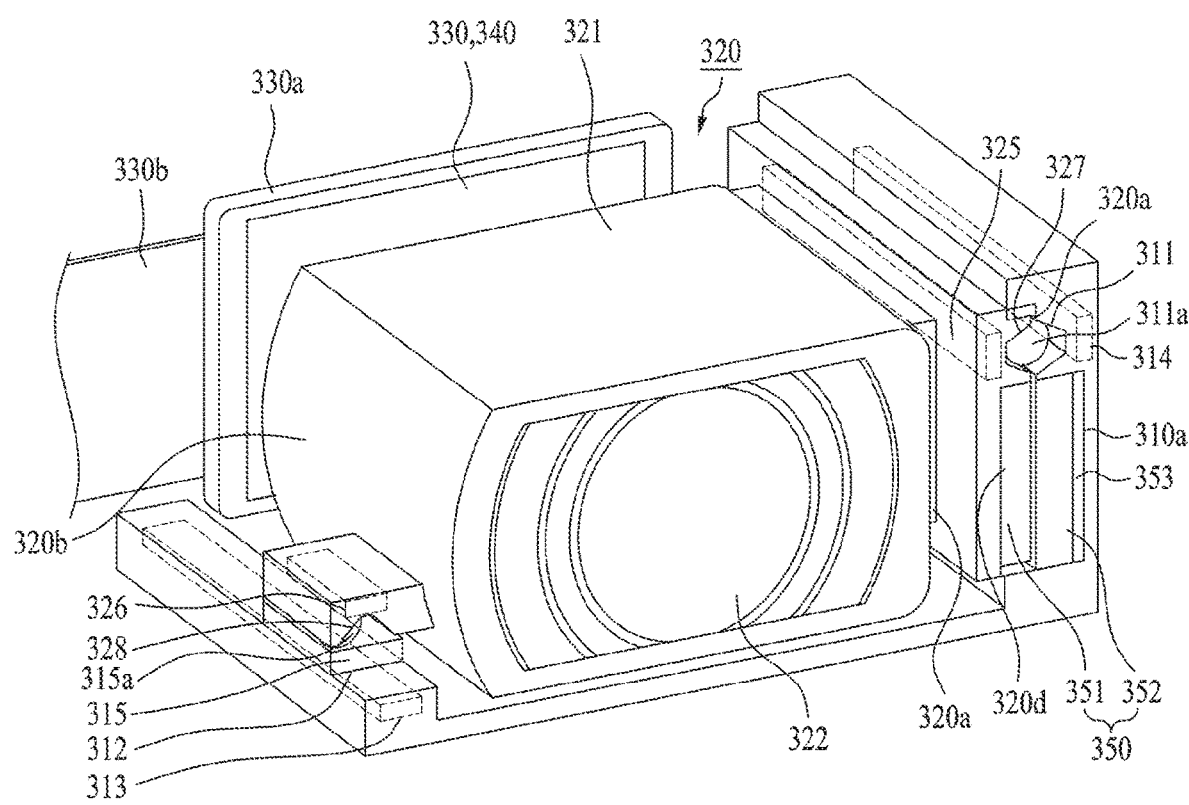

FIG. 9 is a schematic view illustrating a rear camera according to the present disclosure, FIG. 10 is a block diagram illustrating the rear camera illustrated in FIG. 9, FIGS. 11 and 12 are a perspective view and an exploded perspective view illustrating the rear camera illustrated in FIG. 9, respectively, and FIGS. 13A and 13B are a plane view and a perspective view illustrating an exemplary rear camera according to the present disclosure.

The rear camera 300 may include a housing 310 with a space of a predetermined size formed therein. The housing 310 may accommodate various parts of the rear camera 300 in the internal space, and may be configured protect the parts. The housing 310 may include an opening to receive external light, for image acquisition, and an iris 301 may be mounted in the opening. The iris 301 may control the intensity of light incident on the rear camera 300.

The rear camera 300 may include a lens assembly 320 mounted inside the housing 310. The lens assembly 320 may be aligned with the opening of the housing 310, which is located relatively in front of the lens assembly 320, and may be configured to control the focus of incident light. As illustrated in FIGS. 13A and 13B, the lens assembly 320 may include a case 321 of a predetermined size and a lens 322 mounted inside the case 321. There may be a single or multiple lenses 322. The lens assembly 320 may be configured to control the focus of incident light and an image formed by the incident light. For control of the focus (or focal length), the lens assembly 320, that is, the case 321 and the lens 322 may be configured to be movable along a path in which light travels in the housing 310, that is, an optical path or optical axis. That is, the housing 310 is fixed for accommodating the camera 300, whereas the lens assembly 320 may be a part within the housing 310, which moves relative to the housing 310. Further, for focus control, the lens 322 may also be configured to be movable inside the case 321.

To stably move in the housing 310, the lens assembly 320 needs to be supported by the housing 310. For the support, the lens assembly 320 may be formed into a shape matching the shape of the inner surface of the housing 310 on the whole. That is, the outer surface of the lens assembly 320 accommodated in the housing 310 may face the inner surface of the housing 310. More specifically, the lens assembly 320 may include a plurality of different surfaces, that is, first and second surfaces 320a and 320b, which face the housing 310, or more exactly the inner surface of the housing 310. The configurations and functions of the first and second surfaces 320a and 320b of the rear camera 300 are substantially identical to those of the first and second surfaces 220a and 220b of the front camera 200. Accordingly, the description of the first and second surfaces 220a and 220b are referred to, with a redundant description omitted.

Further, the rear camera 300 may include an image sensor 330 configured to detect an image from light that has passed through the lens assembly 320. The image sensor 330 may be disposed in the vicinity of an output unit of the lens assembly 320, that is, behind the lens assembly 320 in the drawings in order to receive light focused by the lens assembly 320. The image sensor 330 may include an RGB filter 331 that senses RGB colors, and a sensor array 332 that converts an optical signal included in the focused light into an electric signal. As illustrated in FIGS. 11, 13A and 13B, the rear camera 300 may include a connector 330b that connects a board 330a (e.g., a PCB) disposed behind the lens assembly 320 to an internal control part of the mobile terminal 100, that is, the controller 180 (e.g., a processor). The image sensor 330 may be mounted to face the rear end, that is, output end of the lens assembly 320. Further, the rear camera 300 may include an image processor 340, which may be mounted together with the image sensor 330 on the board 330a. The image processor 340 may generate an image by means of the electric signal detected from the image sensor 330. Like an image generated in the front camera 200, the generated image may be transmitted to the controller 180 via the connector 330b, and additionally processed in the controller 180, for a required function.

Further, as illustrated in FIGS. 11, 13A and 13B, the rear camera 300 may include an actuator 350 configured to move the lens assembly 320 relative to the housing 310 fixed to the mobile terminal 100, for focus control. The actuator 350 may be configured to provide driving force to the lens assembly 320 so that the lens assembly 320 may move. The actuator 350 may adopt any of various mechanisms to provide the driving force. For example, the actuator 350 may be configured as the same VCM as the actuator 250 of the front camera 200. The actuator 350 may include a magnet 351 that forms a magnetic field over a predetermined area, and a coil 352 disposed opposite to the magnet 351. When current is applied to the coil 352 within the magnetic field of the magnet 351, force is generated between the magnet 351 and the coil 352, and the lens assembly 320 may make a linear motion with the force. The actuator 350 may be electrically coupled to the controller 180, and accordingly, the controller 180 may control the operation of the actuator 350. For example, the coil 352 may be connected to the controller 180 by a separate wire. Alternatively, the coil 352 may be coupled to the controller 180 via the board 330a and the connector 330b. The controller 180 may control current applied to the coil 352 via the electrical connection, thereby controlling the operation of the actuator 350. Therefore, the controller 180 may control the operation of the actuator 350 based on a distance to an object and other conditions as well as the quality of an image received from the image sensor 330 and the image processor 340, so as to move the lens assembly 320, for focus control.

The parts of the actuator 350 may be disposed separately in the lens assembly 320 and the housing 310 in order to enable smooth movement of the lens assembly 320. For example, as illustrated in FIGS. 13A and 13B, the actuator 350 may be disposed on a side surface of the lens assembly 320, that is, the first surface 320a, and a part of the housing 310 facing the first surface 320a, that is, a part of the inner surface of the housing 310 opposite to the first surface 320a. More specifically, the magnet 351 of the actuator 350 may be mounted on the first surface 320a, and the coil 352 may be mounted on a part of the housing 310 opposite to the first surface 320a.

Further, the magnet 351 and the coil 352 are substantially bulky, thereby leading to an increase in the size of the rear camera 300. Therefore, the actuator 350, that is, the magnet 351 and the coil 352 may be accommodated in the lens assembly 320 and the housing 310, without protruding from the lens assembly 320 and the housing 310. More specifically, the rear camera 300 may include a first recess 320d formed on a side part or side surface of the lens assembly 320, that is, on the first surface 320a, and a second recess 310a formed on a part of the housing 310, opposite to the first recess 320d. The magnet 351 and the coil 352 may be accommodated in the first and second recesses 320d and 310a, respectively, without protruding from the first and second recesses 320d and 310a. Therefore, the actuator 350 may be mounted in the rear camera 300 without increasing the spacing between the housing 310 and the lens assembly 320, thereby maintaining the rear camera 300 compact in size. Further, the actuator 350 may further include a magnetic body 353 mounted in the housing 310, in the vicinity of the coil 352. The magnetic body 353 may be disposed between the coil 352 and the housing 310, that is, a part of the housing 310, not between the magnet 351 and the coil 352, in order not to interfere with the operation of the actuator 350. The magnetic body 353 within the magnetic field of the magnet 351 is attracted toward the magnet 351, and thus coupling force may be provided between the lens assembly 320 with the magnet 351 mounted therein and the housing 310 with the magnetic body 353 mounted therein.

Further, the rear camera 300 may include a prism assembly 360 configured to additionally control the path and focus of light incident on the rear camera 300. For the control of the path and focus of light, the prism assembly 360 may be disposed between an opening of the mobile terminal 100 in which light is incident and the lens assembly 320. Referring to FIG. 11, the prism assembly 360 may include a first prism module 361 and a second prism module 362 disposed between the first prism module 361 and the lens assembly 320. The first prism module 361 may receive light from the outside of the mobile terminal 100. The second prism module 362 may be optically coupled to the first prism module 361 and the lens assembly 320, and transfer received light to the lens assembly 320. The first and second prism modules 361 and 362 may include first and second prisms 361a and 362a, respectively, and each of these prisms 361a and 362a may include a reflective surface that reflects incident light and thus changes the path of the light.

As illustrated in FIG. 11, the first prism module 361 may switch a first path L1 of light incident perpendicularly onto the rear surface of mobile terminal 100 to a second path L2 parallel to the rear surface of the mobile terminal 100 by means of the first prism 361a. That is, the first prism module 361 may reflect light traveling along the first path L1 so that the light travels along the second path L2. The second path L2 may be perpendicular to the first path L1, for example, oriented along the length direction of the mobile terminal 100. Further, the second prism module 362 may switch the second path L2 to a third path L3 by means of the second prism 362a. That is, the second prism module 362 may reflect light traveling along the second path L2 so that the light travels along the third path L3. Like the second path L2, the third path L3 is parallel to the rear surface of the mobile terminal 100, like the second path L2, but perpendicular to the second path L2, and thus may be oriented along the width direction of the mobile terminal 100. While the mobile terminal 100 has a small thickness, it has a relatively large width. Therefore, if the lens assembly 320 is oriented in a direction perpendicular to the rear surface of the mobile terminal 100, that is, in the thickness direction of the mobile terminal 100, the lens assembly 320 may move only for a short distance, thereby limiting focus control. On the other hand, if the lens assembly 320 is oriented in the width direction of the lens assembly 320, the lens assembly 320 may effectively perform focus control, while moving for a very long distance. As described above, the prism assembly 360 enables the lens assembly 320 having a long movement distance by switching a path of incident light to the width direction of the mobile terminal 100.

Further, the first prism module 361 may rotate the first prism 361a upon a first rotation axis S1, and the second prism module 362 may rotate the second prism 362a upon a second rotation axis S2. The first rotation axis S1 is parallel to the rear surface of the mobile terminal 100, and thus the first prism 361a may rotate perpendicularly to the rear surface of the mobile terminal 100. Further, the second rotation axis S2 is perpendicular to the rear surface of the mobile terminal 100, and thus the second prism 362a may rotate horizontally to the rear surface of the mobile terminal 100. In practice, while the mobile terminal 100 is acquiring an image, lots of shaking, for example, impact or hand tremor may be applied to the mobile terminal 100, thereby degrading the quality of the image. When shaking occurs, the controller 180 may sense the magnitude of the shaking, and compensate for the shaking by rotating the first and second prisms 361a and 362a at a predetermined angle based on the sensed magnitude. Therefore, the prism assembly 360 may remarkably improve the quality of an image acquired from the rear camera 300.

More specifically, referring to FIG. 12, the first prism module 361 may include the first prism 361a and a holder 361b configured to accommodate the first prism 361a. The holder 361b may be rotatably coupled with a bracket 361h. For example, the bracket 361h may include a pair of arms apart from each other by a predetermined gap, and the holder 361b may include a pair of shafts apart from each other by a predetermined gap. The shafts of the holder 361b may be rotatably coupled with the arms of the bracket 361h, respectively, and thus the holder 361b may rotate upon the shafts. Further, a yoke 361c may be mounted on a side part of the holder 361b facing the bracket 361h, and a magnet 361d may be disposed inside the yoke 361c. A coil 361e may be mounted on the bracket 361h, to face the magnet 361d. Further, a hall sensor 361g may be disposed between the magnet 361d and the coil 361e. Similarly to the configuration of the first prism module 361, the second prism module 362 may include the second prism 362a and a holder 363b configured to accommodate the second prism 362a. The holder 362b may be rotatably coupled with a bracket 362h. The bracket 362h may include a pair of arms apart from each other by a predetermined gap, and the holder 362b may include a pair of shafts apart from each other by a predetermined gap. The shafts of the holder 362b may be rotatably coupled with the arms of the bracket 362h, respectively, and thus the holder 362b may rotate upon the shafts. Further, a yoke 362c may be mounted on a side part of the holder 362b facing the bracket 362h, and a magnet 362d may be disposed inside the yoke 362c. A coil 362e may be mounted on the bracket 362h, to face the magnet 362d. Further, a hall sensor 362g may be disposed between the magnet 362d and the coil 362e.

In the first and second prism modules 361 and 362, the magnet 361d and the coil 361e may form a first actuator 361f configured to rotate the first prism 361a, and the magnet 362d and the coil 362e may form a second actuator 362f configured to rotate the second prism 362a. The controller 180 may sense the positions of the first and second prisms 361a and 362a, using the hall sensors 361g and 362g. Therefore, when shaking occurs, the controller 180 may supply current to the coils 361e and 362e, and the first and second prisms 361a and 362a may rotate together with the holders 361b and 362b. More specifically, the controller 180 may control current supplied to the coils 361e and 362e based on the pre-sensed positions of the first and second prisms 361a and 362a, and rotate the first and second prisms 361a and 362a at an angle that compensates for the shaking. Further, the controller 180 may continue monitoring the amounts of rotation of the first and second prisms 361a and 362a, using the hall sensors 361g and 362g, and control rotation of the first and second prisms 361a and 362a in real time according to the degree of shaking based on the monitoring.

As described before, the lens assembly 320 may move relative to the fixed housing 310, for focus control. For the reason described before with reference to the front camera 200, the rear camera 300 may include a guide configured to support the outer surfaces of the lens assembly 320 with respect to the housing 310 in order to guide the relative movement.

The guide of the rear camera 300 may be installed at various parts of the lens assembly 220 and the housing 210. However, for the reason described before with reference to the front camera 200, the rear camera 300 may include, as the guide, a first guide 311 and 327 configured to support the first surface 320a of the lens assembly 320 with respect to the housing 310, as illustrated in FIGS. 13A and 13B. The first guide 311 and 327 may be close to the actuator 350 disposed on the first surface 320a, and guide the lens assembly 320, or more exactly the first surface 320a of the lens assembly 320 to make a relative motion with respect to the housing 310.

More specifically, the first guide may include a retainer 311 provided on a surface of the housing 310 opposite to the first surface 320a of the lens assembly 320. The retainer 311 may be a groove of a predetermined depth. The retainer 311 may be extended to a predetermined length along an optical axis direction of the lens assembly 320. Further, the retainer 311 may be formed continuously from the front end to the rear end of the housing 310 in the drawings.

Further, the first guide may include a rolling member 311a accommodated in the retainer 311. The rolling member 311a may be a ball of a predetermined size. Alternatively, the rolling member 311a may be a roller. This rolling member 311a may protrude from the retainer 311 to contact the first surface 320a. Further, the rolling member 311a may be configured to roll in the retainer 311.

Further, the first guide may include an additional retainer 327 formed on the first surface 320a. The additional retainer 327 may be disposed to face the retainer 311. Like the retainer 311, the additional retainer 327 may be a groove of a predetermined depth. The additional retainer 327 may be extended to a predetermined length along the optical axis direction of the lens assembly 320. Further, the additional retainer 327 may be formed continuously from the front end to the rear end of the lens assembly 320, that is, the first surface 320a in the drawings. The additional retainer 327 may accommodate a part of the rolling member 311a protruding from the retainer 311, and the rolling member 311a may contact the inner surfaces of both of the retainers 311 and 327. As the rolling member 311a is accommodated in both of the retainers 311 and 327 during movement of the lens assembly 320, the rolling member 311a may make a more stable rolling motion. Accordingly, the first guide may stably support the first surface 320a of the lens assembly 320, thereby guiding movement of the lens assembly 320 smoothly.

Further, for the reason described before with reference to the front camera 200, the rear camera 300 may include a second guide 324 and 312 as an additional guide, which is configured to support the other side surface opposite to the first surface 320a of the lens assembly 320, that is, the second surface 320b with respect to the housing 310. The second guide 324 and 312 may guide the lens assembly 320, or more exactly the second surface 320b thereof to make a motion relative to the housing 310. Further, as described before with reference to the front camera 200, force exerted in parallel to the second surface 320b may also be generated by reaction force from the first guide, and a rotation moment in the rear camera 300, and the second guide 324 and 312 may be configured to support this force on the second surface 320b.

Considering these conditions, the second guide may include a first bearing 324 extended from the second surface 320b of the lens assembly 320 toward the housing 310. Further, the second guide may include a second bearing 312 formed in the housing 310 and configured to support the first bearing 324. More specifically, the second bearing 312 may be extended from the housing 310 toward the first bearing 324, and may overlap with the first bearing 324 in order to support the extended first bearing 324. The first and second bearings 324 and 312 may include first and second surfaces 324a and 312a facing each other, respectively.

If the first and second bearings 324 and 312 are oriented in a direction transverse to the second surface 320b, the first and second bearings 324 and 312 may appropriately support force parallel to the second surface 320b, caused by reaction force from the first guide. For this reason, the first and second bearings 324 and 312 may be extended and oriented in a direction other than a direction parallel to the second surface 320b, and the first and second surfaces 324a and 312a may also be extended in a direction other than the direction parallel to the second surface 320b. Further, the first and second bearings 324 and 312 may be extended and oriented substantially perpendicularly to the second surface 320b to firmly support the force. Likewise, the first and second surfaces 324a and 312a may also be extended and oriented substantially perpendicularly to the second surface 320b. Further, the first bearing 324 may be extended to a predetermined length along the optical axis direction of the lens assembly 320. Likewise, the second bearing 312 may also be extended to a predetermined length along the optical axis direction of the lens assembly 320. For example, considering the configuration illustrated in FIGS. 13A and 13B, the first bearing 324 may be a first arm extended from the second surface 320b toward the housing 310, and the second bearing 312 may be a second arm or stepped portion, which is extended from the housing 310 toward the first bearing 324, that is, the first arm. As illustrated in FIGS. 13A and 13B, the second guide, that is, the first and second bearings 324 and 312 may be disposed in a lower part of the lens assembly 320, or more exactly in a lower part of the side surface 320b of the lens assembly 320. However, as denoted by a dotted line, the first and second bearings 324 and 312 may be arranged at the same height as those of the first guide 311 and 323 in the drawings. That is, like the first guide 311 and 323, the second guide 324 and 312 may be disposed in an upper part of the lens assembly 320. More specifically, the second guide 324 and 312 and the first guide 311 and 323 may be arranged in upper parts of on both side parts or both side surfaces 320a and 320b of the lens assembly 320, respectively. In view of this arrangement, the second guide 324 and 312 may more firmly support the reaction force applied from the support point, that is, the first guide 311 and 323.

The first and second surfaces 324a and 312a of the first and second bearings 324 and 312 may contact each other, for mutual support. In practice, the first surface 324a of the first bearing 324 may correspond to an extension or part of the second surface 320b of the lens assembly 320, and the second surface 312a of the second bearing 312 may correspond to a part of the inner surface of the housing 310. That is, the first and second bearings 324 and 312 may contact directly through the first and second surfaces 324a and 312a so as to support the second surface 320b of the lens assembly 320 with respect to the housing 310, and the first and second surfaces 324a and 312a may act as a kind of bearing surfaces. Since these first and second bearings 324 and 312 are substantially identical to the first and second bearings 224 and 212 illustrated in FIGS. 5A and 5B, an additional description of the first and second bearings 324 and 312 will not be provided herein, with the description of the first and second bearings 224 and 212 referred to.

To provide more stable support than direct contact between the first and second bearings 324 and 312, the second guide may include an additional support structure. As the additional support structure, the second guide may further include a retainer 315 provided on the second surface 312a of the second bearing 312. The retainer 315 may be a groove of a predetermined depth. The inner surface of the retainer 315 may be formed as a part of the second surface 312a. This retainer 315 is extended to a predetermined length along the optical axis direction of the lens assembly 320.

Further, the second guide may further include a rolling member 315a disposed between the first bearing 324 and the second bearing 312, and configured to contact the first surface 324a and the second surface 312a. More specifically, the rolling member 315a may be accommodated in the retainer 315, contact the inner surface of the retainer 315, that is, the second surface 312a, and protrude outward from the retainer 315 to contact the first surface 324a. This rolling member 315a may more smoothly guide the movement of the lens assembly 320, supporting the first surface 324a of the first bearing 324, that is, the second surface 320b of the lens assembly 320, while rolling in the retainer 315. The combination of the retainer 315 and the rolling member 315a is substantially identical to the combination of the retainer 215 and the rolling member 215a illustrated in FIG. 7. Therefore, an additional description of the combination of the retainer 315 and the rolling member 315a will not be provided herein.

Further, the second guide may further include an additional retainer 328 formed on the first surface 324a of the bearing 324. The additional retainer 328 may be disposed to face the retainer 315, and may be a groove of a predetermined depth, like the retainer 315. The inner surface of the additional retainer 328 corresponds to a part of the first surface 324a. The additional retainer 328 may be extended to a predetermined length along the optical axis direction of the lens assembly 320. The additional retainer 328 may accommodate a part of the rolling member 315a protruding from the retainer 315, and the rolling member 315a may contact the inner surfaces of both of the retainers 315 and 328. As the rolling member 315a is accommodated in both of the retainers 315 and 328, the rolling member 315a may make a more stable rolling motion, thereby enabling more stable support and guidance of movement.

Further, to ensure stable operation against impact and under many other conditions as described before with reference to the front camera 200, the rear camera 300 may further include a coupler configured to couple the first and second bearings 324 and 312 to each other during relative movement. The coupler may be configured to provide attractive force between the first and second bearings 324 and 312 without mechanical engagement. For this purpose, the coupler may include a magnet 313 that generates attractive force by a magnetic field and a magnetic body 326 that is attracted by the magnet 313. For stably coupling, the coupler 313 and 326 may be configured to stably attract the first bearing 324 (i.e., the lens assembly 320) to the fixed second bearing 312 (i.e., the housing 310).

Therefore, the coupler may include the magnetic body 326 disposed inside the first bearing 324, in the vicinity of the first surface 324a of the first bearing 324, and the magnet 313 disposed inside the rear bearing 312, in the vicinity of the second surface 312a of the rear bearing 312. More specifically, the magnetic body 326 may be disposed inside the lens assembly 320, that is, the first bearing 324, in the vicinity of the additional retainer 328. The magnet 313 may be disposed inside the housing 310, in the vicinity of the retainer 315. The magnetic body 326 is formed of a material magnetized by a nearby magnetic field, such as iron, and has the feature of being attracted to the magnetic field. Therefore, the magnet 313 together with the magnetic body 326 may attract the first bearing 324 to the second bearing 312. For this reason, the first bearing 324 may be firmly coupled with the second bearing 312 so that the first bearing 324 may not be separated from the second bearing 312 even against external impact.

Further, for the same reason, an auxiliary coupler having a similar function to that of the afore-described coupler 313 and 326 may be applied to the first guide. Similarly to the coupler 313 and 326, the auxiliary coupler may be configured to couple the first surface 320a of the lens assembly 320 with the inner surface of the housing 310 during relative movement, and may include a magnet 314 that generates attractive force between the first surface 320a and the inner surface of the housing 310 by a magnetic field, and a magnetic body 325. As described before in relation to the front camera 200, to counterbalance reaction force applied to the lens assembly 320, the auxiliary coupler 314 and 325 may be configured to attract the lens assembly 320, that is, the first surface 320a toward the housing 310. Therefore, the auxiliary coupler may include the magnetic body 325 disposed inside the lens assembly, in the vicinity of the first surface 320a, and the magnet 314 disposed inside the housing 310, in the vicinity of the surface of the housing 310 facing the first surface 320a. More specifically, the magnet 325 may be disposed inside the lens assembly 320, in the vicinity of the additional retainer 327, and the magnet 314 may be disposed inside the housing 310, in the vicinity of the retainer 311. The magnet 314 together with the magnet body 325 may attract the lens assembly 320 and the first surface 320a thereof toward the housing 310. Therefore, in the first guide, the first surface 320a of the lens assembly 320 may be firmly coupled with the inner surface of the housing 310 facing the first surface 320a, thereby not being separated from the inner surface of the housing 310 even against external impact.

While the configurations of the first and second guides of the rear camera 300 have been described with reference to the example illustrated in FIGS. 13A and 13B, the configurations of the first and second guides of the front camera 200 described with reference to FIGS. 5A to 8 may be applied to the configurations of the first and second guides of the rear camera 300, without any substantial modification.

The camera for an electronic device according to the present disclosure has the following effects.

The camera according to the present disclosure may include a first guide supporting a first surface of a lens assembly, and a second guide supporting a second surface different from the first surface. The first and second guides are disposed at different positions, that is, on both side surfaces of the lens assembly, and are not large in size. Further, the first and second guides are designed in an optimum manner so as to support force generated during movement of the lens assembly. Therefore, the first and second guides stably guide the movement of the lens assembly, without increasing the size of the camera. Owing to the first and second guides, the camera may exert desired high performance, being kept small in size.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

Although a number of representative examples are described above, it should be understood that numerous other modifications of these examples that fall within the spirit and scope of the principles of this disclosure can be devised by those skilled in the art. More particularly, various variations and modifications are possible within the scope of the disclosure, the drawings and the appended claims. In addition to variations and modifications, alternative uses will also be apparent to those skilled in the art.

What is claimed is:

1. A camera for an electronic device, the camera comprising:
 a housing;
 a lens assembly movably coupled to an inside of the housing;
 an actuator configured to cause the lens assembly to move relative to the housing; and
 a guide provided in the lens assembly and the housing, and configured to guide the lens assembly relative to the housing,
 wherein the guide comprises:
  a first guide configured to support a first surface of the lens assembly with respect to the housing; and
  a second guide configured to support a second surface of the lens assembly with respect to the housing, wherein the second surface is different from the first surface, and
 wherein the second guide comprises:
  a first bearing extended from the second surface of the lens assembly toward the housing; and
  a second bearing provided in the housing, and configured to support a first surface of the first bearing.

2. The camera according to claim 1, wherein the actuator is provided on the first surface of the lens assembly and a part of the housing, opposite to the first surface, and the first guide is disposed adjacent to the actuator.

3. The camera according to claim 1, wherein the second surface of the lens assembly is not directly coupled to the first surface such that the second surface does not contact the first surface.

4. The camera according to claim 1, wherein the second guide is disposed opposite to the first guide.

5. The camera according to claim 1, wherein the first guide comprises:
 a retainer provided on one of the first surface of the lens assembly and a surface of the housing, opposite to the first surface;
 a rolling member accommodated in the retainer and configured to roll inside the retainer; and
 a bearing surface provided on another one of the first surface of the lens assembly and the surface of the housing, and configured to contact the rolling member.

6. The camera according to claim 5, wherein the retainer is extended up to a predetermined length along an optical axis direction of the lens assembly.

7. The camera according to claim 5, wherein the retainer is a groove having a predetermined depth.

8. The camera according to claim 5, wherein the rolling member is a ball or a roller.

9. The camera according to claim 5, wherein the bearing surface is configured to form a common plane with the first surface of the lens assembly.

10. The camera according to claim 5, wherein the first guide comprises a bearing member embedded into one of the first surface of the lens assembly or the surface of the housing, to face the retainer, and having the bearing surface contacting the rolling member.

11. The camera according to claim 1, wherein the first and second bearings are extended up to a predetermined length along an optical axis direction of the lens assembly.

12. The camera according to claim 1, wherein the first surface of the first bearing and a second surface of the second bearing are not parallel to the second surface of the lens assembly.

13. The camera according to claim 1, wherein the first surface of the first bearing and a second surface of the second bearing are oriented perpendicularly to the second surface of the lens assembly.

14. The camera according to claim 1, wherein the second bearing is extended to overlap with the first bearing.

15. The camera according to claim 1, wherein the second guide further comprises a rolling member disposed between the first bearing and the second bearing, and configured to roll in contact with the first surface of the first bearing and a second surface of the second bearing.

16. The camera according to claim 15, wherein the second guide further comprises a retainer provided on one of the first surface of the first bearing and the second surface of the second bearing, and configured to accommodate the rolling member.

17. The camera according to claim 1, further comprising a coupler configured to couple the first and second bearings to each other during relative movement by providing attractive force between the first and second bearings.

18. The camera according to claim 17, wherein the coupler comprises:
 a magnetic body disposed inside the first bearing, in vicinity of the first surface of the first bearing; and
 a magnet disposed inside the second bearing, in vicinity of the second surface of the second bearing, and attracting the magnetic body and the first bearing to the second bearing.

19. The camera according to claim 1, wherein the actuator comprises a magnet provided on the first surface of the lens assembly and a coil provided in the housing, facing the magnet, and
 wherein the magnet is accommodated in a first recess formed in the lens assembly, and the coil is accommodated in a second recess formed in the housing.

* * * * *